United States Patent
Mishra et al.

(10) Patent No.: US 11,797,667 B2
(45) Date of Patent: Oct. 24, 2023

(54) REAL-TIME DETECTION AND LOCALIZATION OF DOS ATTACKS IN NOC BASED SOC ARCHITECTURES

(71) Applicant: University of Florida Research Foundation, Inc., Gainesville, FL (US)

(72) Inventors: Prabhat Kumar Mishra, Gainesville, FL (US); Thelijjagoda S N Charles, Gainesville, FL (US); Yangdi Lyu, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 94 days.

(21) Appl. No.: 16/913,850

(22) Filed: Jun. 26, 2020

(65) Prior Publication Data

US 2020/0410092 A1    Dec. 31, 2020

Related U.S. Application Data

(60) Provisional application No. 62/868,258, filed on Jun. 28, 2019.

(51) Int. Cl.
    *G06F 21/55* (2013.01)
(52) U.S. Cl.
    CPC ...... *G06F 21/552* (2013.01); *G06F 2221/034* (2013.01)
(58) Field of Classification Search
    CPC .................. G06F 21/552; G06F 2221/034
    See application file for complete search history.

(56) References Cited

U.S. PATENT DOCUMENTS

| 9,794,281 | B1 * | 10/2017 | Radlein | ............... H04L 63/1458 |
| 10,496,770 | B2 * | 12/2019 | Kumar | ................. G06F 30/33 |
| 10,721,269 | B1 * | 7/2020 | Talmor | .................. H04L 67/02 |

(Continued)

OTHER PUBLICATIONS

Chaves et al., "DoS attack detection and path collision localization in NoC-based MpsoC architectures." Journal of Low Power Electronics and Applications 9.1. Feb. 2019. (Year: 2019).*

(Continued)

*Primary Examiner* — Chau Le
*Assistant Examiner* — Zhe Liu
(74) *Attorney, Agent, or Firm* — Thomas | Horstemeyer, LLP

(57) ABSTRACT

Various examples are provided related to software and hardware architectures that enable lightweight and real-time Denial-of-Service (DoS) and Distributed Denial-of-Service (DDoS) attack detection. In one example, among others, a method for detection and localization of denial-of-service (DoS) attacks includes detecting, by a router of an intellectual property (IP) core in a network-on-chip (NoC) based system-on-chip (SoC) architecture, a compromised packet stream based at least in part upon a packet arrival curve (PAC) associated with the router; identifying, by the IP core, a candidate IP core in the NoC as a potential attacker based at least in part upon a destination packet latency curve (DLC) associated with the IP core; and transmitting, by the router, a notification message indicating that the candidate IP core is the potential attacker to a router of the candidate IP core.

14 Claims, 16 Drawing Sheets

(56) References Cited

U.S. PATENT DOCUMENTS

| | | | | |
|---|---|---|---|---|
| 11,165,802 | B2* | 11/2021 | Tews | H04L 63/1425 |
| 2001/0014093 | A1* | 8/2001 | Yoda | H04L 63/1441 |
| | | | | 370/429 |
| 2005/0249214 | A1* | 11/2005 | Peng | H04L 63/1458 |
| | | | | 709/224 |
| 2006/0248588 | A1* | 11/2006 | Jayaraman | H04L 63/1458 |
| | | | | 726/22 |
| 2008/0028467 | A1* | 1/2008 | Kommareddy | H04L 63/1458 |
| | | | | 726/23 |
| 2008/0162679 | A1* | 7/2008 | Maher | H04L 63/1458 |
| | | | | 709/223 |
| 2014/0380459 | A1* | 12/2014 | Lee | H04L 63/0227 |
| | | | | 726/13 |
| 2017/0222976 | A1* | 8/2017 | Gross | H04L 63/1425 |
| 2018/0020324 | A1* | 1/2018 | Beauford | H04W 4/025 |
| 2020/0028863 | A1* | 1/2020 | Wolfson | H04L 63/1441 |
| 2020/0213352 | A1* | 7/2020 | Fainberg | H04W 12/122 |

OTHER PUBLICATIONS

Jayashankara Shridevi et al. "Runtime Detection of a Bandwidth Denial Attack from a Rogue Network-on-Chip." Proceedings of the 9th International Symposium on Networks-on-Chip. Sep. 2015, p. 1-8. (Year: 2015).*

Chaves et al. "A Distributed DoS Detection Scheme for NoC-based MPSoCs." 2018 IEEE Nordic Circuits and Systems Conference (NORCAS): NORCHIP and International Symposium of System-on-Chip (SoC). Oct. 2018, p. 1-6. (Year: 2018).*

Ramachandran et al. "Network on Chip: A review on data security and privacy issues." 2021 International Conference on Communication, Control and Information Sciences (ICCISc), vol. 1, IEEE. 2021. p. 1-5. (Year: 2021).*

Thinh, et al. "FPGA-Based Multiple DDoS Countermeasure Mechanisms System Using Partial Dynamic Reconfiguration." REV Journal on Electronics and Communications vol. 5, No. 3-4. 2016. p. 67-75. (Year: 2015).*

Waszecki, et al., "Automotive electrical and electronic architecture security via distributed in-vehicle traffic monitoring", IEEE transactions on computer-aided design of integrated circuits and systems, 36 (11), 2017.

Rajesh JS, et al., "Runtime detection of a bandwidth denial attack from a rogue network-on-chip", NOCS' 15, Sep. 28-30, 2015. ACM.

Fiorin, et al., "A security monitoring service for NoCs", CODES + ISSS'08 Oct. 19-24, 2008. ACM.

Fang, et al., "Robustness analysis of Mesh-based network-on-chip architecture under flooding-based denial of service attacks", 2013 IEEE Eighth International Conference on Networking, Architecture and Storage.

* cited by examiner

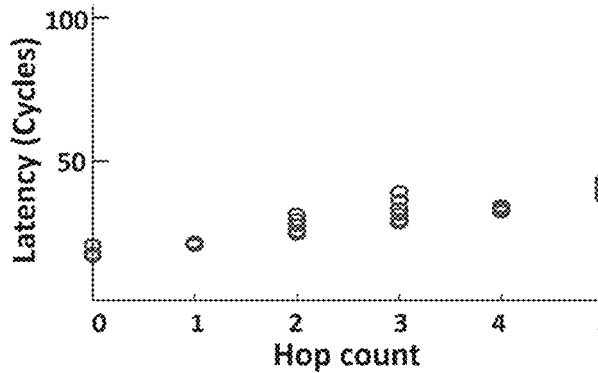
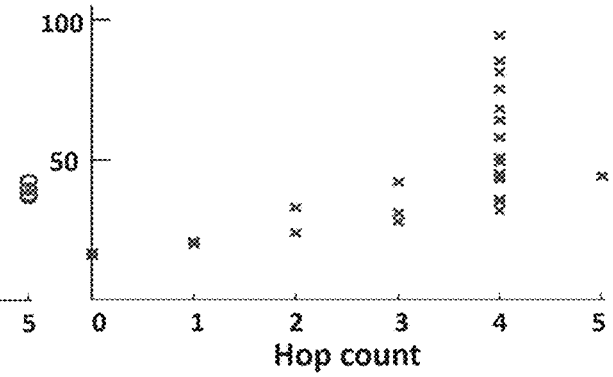

FIG. 6A  FIG. 6B

Algorithm 1: Detecting compromised packet streams

```
/* Input: (θ_{r,s}, ω_{r,s}) tuples containing parameterized PAC
   bound at router r.                                         */
1  for s ∈ {1, n} do
2      TIMER_{r,s} = θ_{r,s}
3      COUNTER_{r,s} = ω_{r,s}
4  end
5  if packetReceived = TRUE then
6      for s ∈ {1, n} do
7          if COUNTER_{r,s} = ω_{r,s} then
8              TIMER_{r,s} = θ_{r,s}
9          end
10         COUNTER_{r,s} = COUNTER_{r,s} − 1
11         if COUNTER_{r,s} < 0 then
12             attacked(r) = TRUE
13         end
14     end
15 end
16 for s ∈ {1, n} do
17     if timeoutOccured(TIMER_{r,s}) = TRUE then
18         COUNTER_{r,s} = min(COUNTER_{r,s} + 1, ω_{r,s})
19         TIMER_{r,s} = θ_{r,s}
20     end
21 end
```

FIG. 7

Algorithm 2: Event handler for router $R$

```
1  upon event RESET:
2    R.flag[p_i] = 0 for all ports p_i 3  upon event attacked == TRUE:
4    send a signal to local IP 5  upon receiving a diagnostic message < S, D > from port p_i:
6    start TIMEOUT if all R.flag == 0
7    if S is local IP then
8        if flag[p_i] == 0 then
9            flag[p_i] = 1              // local IP is the M3PIP
10       end
11       if flag[p_i] == 2 then
12           // false positive, do nothing
13       end
14   end
15   else
16       //S is not local IP
17       Let N be the neighbor of R that sits in the path from S to R
18       if path from N to R is congested then
19           sends a diagnostic message < S, D > to N indicating that S is a
                candidate attacker
20           flag[p_i] = 2              // other IP is the M3PIP
21       end
22       else
23           // false positive, do nothing
24       end
25   end 26  upon event TIMEOUT:
27   if any flag in R.flag is 1 then
28       broadcasting that its local IP is the attacker
29       RESET
30   end
```

FIG. 9

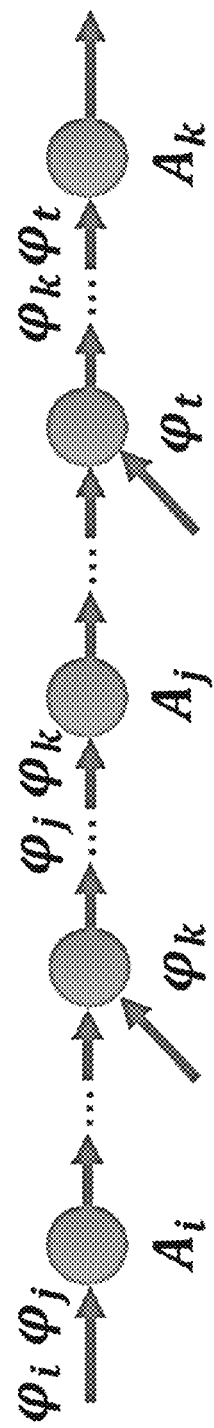
FIG. 10
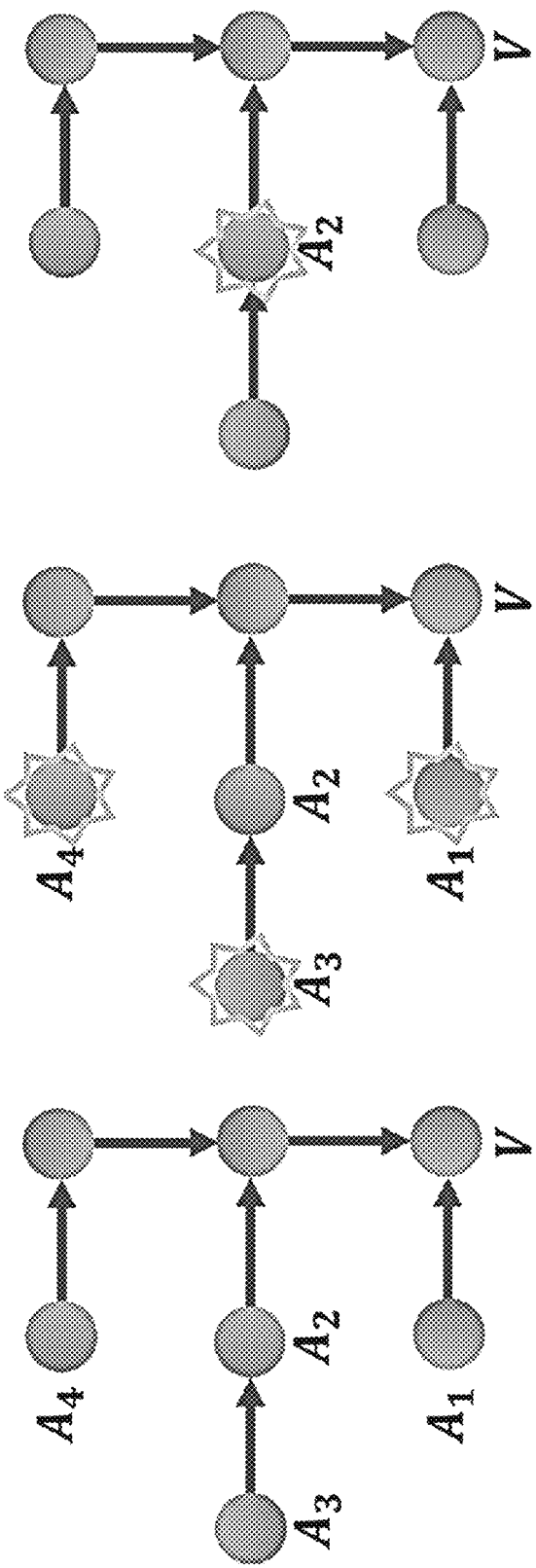
FIG. 11A
FIG. 11B
FIG. 11C

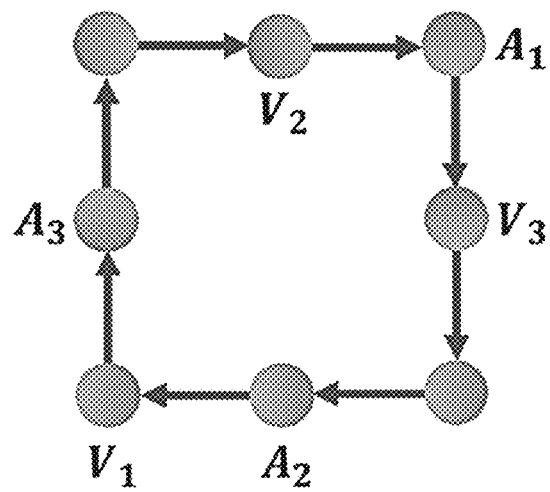 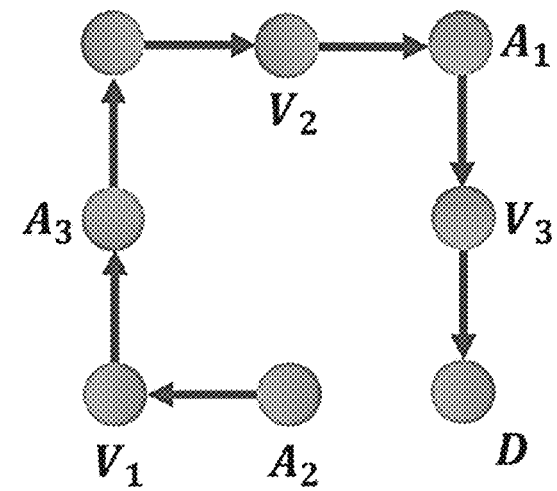
FIG. 12A  FIG. 12B
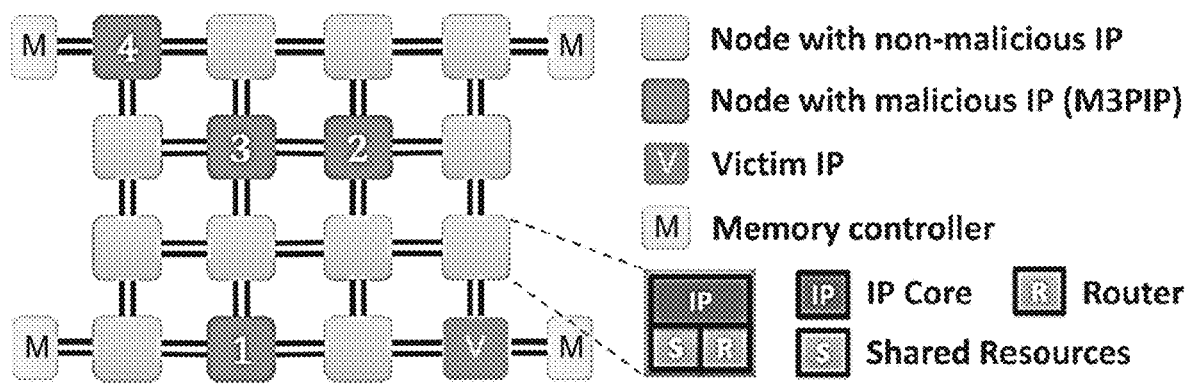
FIG. 13

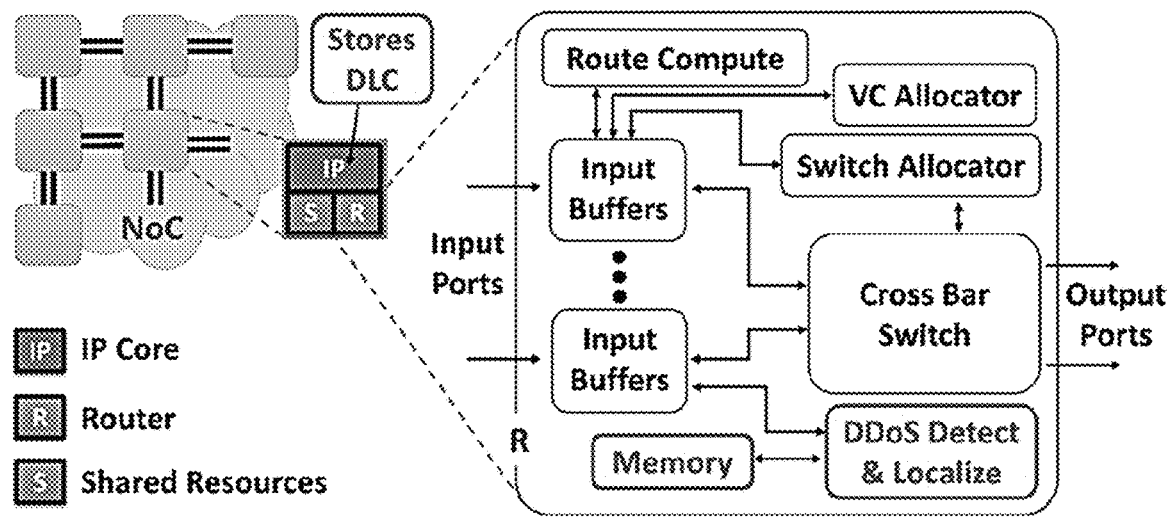
FIG. 20
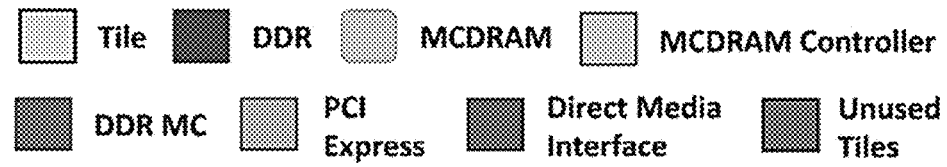
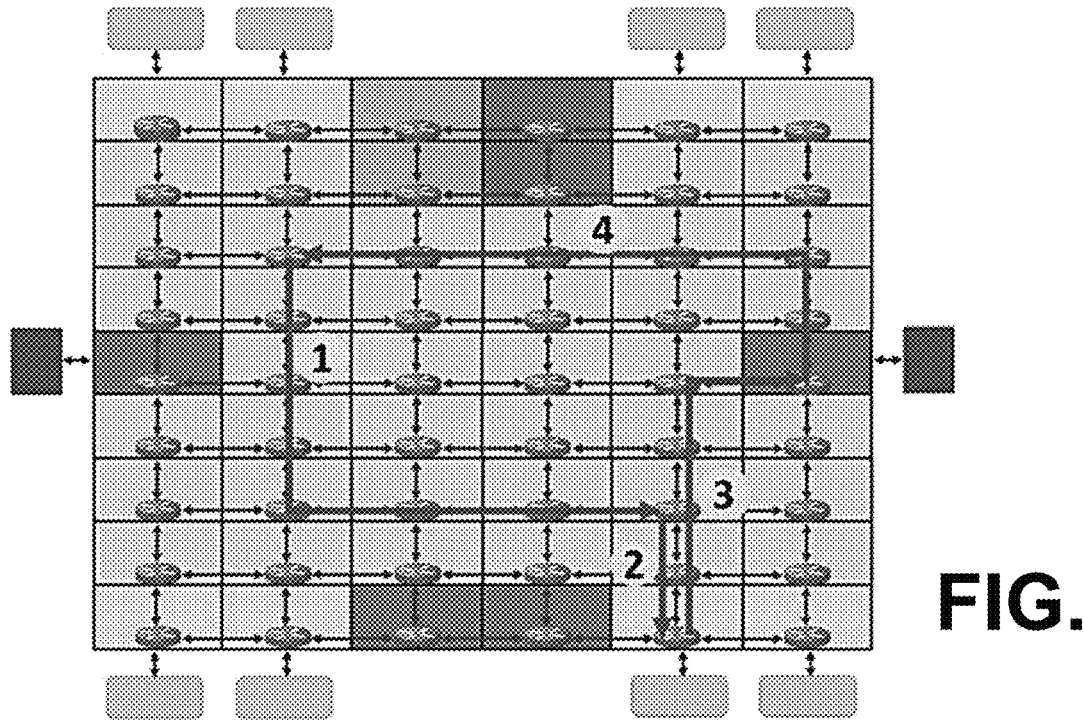
FIG. 21

TABLE I: System configuration parameters used when modelling KNL on gem5 simulator.

| Processor Configuration | |
|---|---|
| Number of cores | 32 |
| Core frequency | 1.4 GHz |
| Instruction set architecture | x86 |
| Memory System Configuration | |
| L1 cache | private, separate instruction and data cache. Each 16kB in size. |
| Cache coherence | distributed directory-based protocol |
| Memory size | 4GB DDR |
| MCDRAM | shared, direct mapped cache |
| Access latency | 300 cycles |
| Interconnection Network Configuration | |
| Topology | 4x8 Mesh |
| Routing scheme | X-Y deterministic |
| Router | 4 port, 4 input buffer router with 5 cycle pipeline delay |
| Link latency | 1 cycle |

FIG. 22

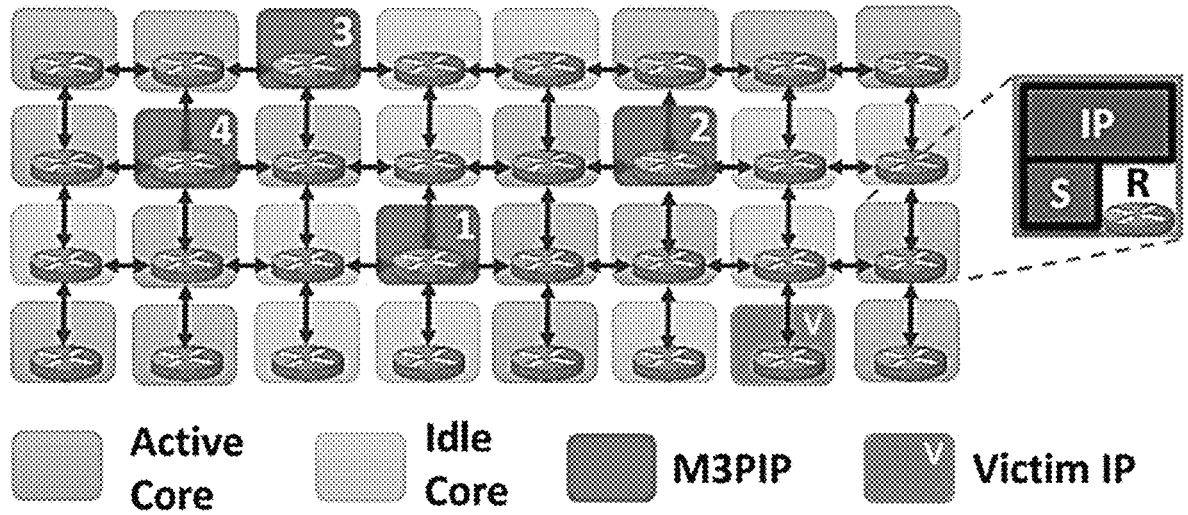

FIG. 23

REAL-TIME DETECTION AND LOCALIZATION OF DOS ATTACKS IN NOC BASED SOC ARCHITECTURES

CROSS REFERENCE TO RELATED APPLICATIONS

This application claims priority to, and the benefit of, U.S. provisional application entitled "Real-Time Detection and Localization of DoS Attacks in NoC Based SoC Architectures" having Ser. No. 62/868,258, filed Jun. 28, 2019, which is hereby incorporated by reference in its entirety.

STATEMENT REGARDING FEDERALLY SPONSORED RESEARCH OR DEVELOPMENT

This invention was made with government support under 1526687 awarded by the National Science Foundation. The government has certain rights in the invention.

BACKGROUND

Network-on-Chip (NoC) is widely employed by multi-core System-on-Chip (SoC) architectures to cater to their communication requirements. The increased usage of NoC and its distributed nature across the chip has made it a focal point of potential security attacks. Denial-of-Service (DoS) is one such attack that is caused by a malicious intellectual property (IP) core flooding the network with unnecessary packets causing significant performance degradation through NoC congestion.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-6B illustrate examples for real-time detection and localization of DoS/DDoS attacks, in accordance with various embodiments of the present disclosure.

FIG. 7 illustrates an example of detection of compromised packet streams, in accordance with various embodiments of the present disclosure.

FIG. 9 illustrates an example of determination of malicious IP by a router associated with the candidate IP, in accordance with various embodiments of the present disclosure.

FIG. 10 illustrates an example of a diagnostic message path constructed by following the flow of a diagnostic message in each attacker, in accordance with various embodiments of the present disclosure.

FIGS. 11A-11C illustrate an example showing how the detection and localization framework works, in accordance with various embodiments of the present disclosure.

FIGS. 12A and 12B illustrate an example of attacker cooperation in a congested graph and how they are revealed, in accordance with various embodiments of the present disclosure.

FIG. 13 illustrates an example of M3PIP and victim IP placement when running tests, in accordance with various embodiments of the present disclosure.

FIG. 20 illustrates an example of security components integrated into an NoC component, in accordance with various embodiments of the present disclosure.

FIG. 21 illustrates an example of the KNL architecture, in accordance with various embodiments of the present disclosure.

FIG. 22 illustrates a table of system configuration parameters used when modeling the KNL architecture, in accordance with various embodiments of the present disclosure.

FIG. 23 illustrates an example of a 4×8 Mesh NoC architecture used to simulate DoS, in accordance with various embodiments of the present disclosure.

DETAILED DESCRIPTION

Figure 1:
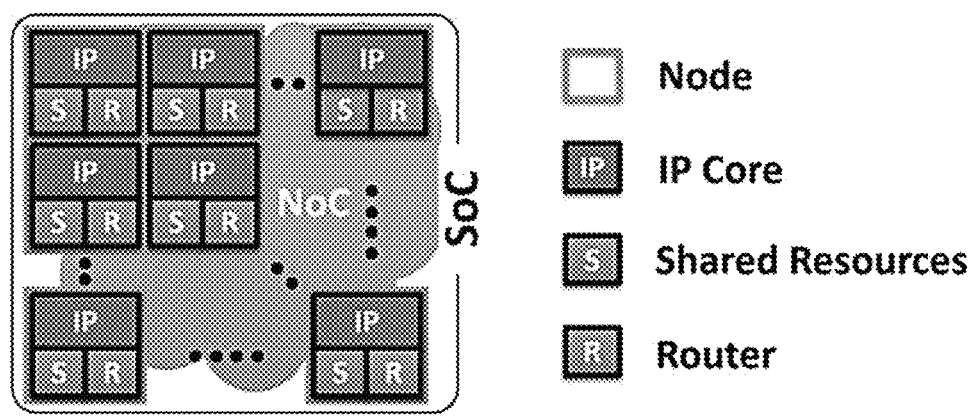
FIG. 1 illustrates an example of a Network-on-Chip (NoC) based multi-core System-on-Chip (SoC) architecture, in accordance with various embodiments of the present disclosure.

Disclosed herein are various examples related to software and hardware architectures that enable lightweight and real-time Denial-of-Service (DoS) and Distributed Denial-of-Service (DDoS) attack detection. Once a potential attack has been flagged, the disclosed approach is capable of localizing the malicious intellectual property (IP) using latency data gathered by Network-on-Chip (NoC) components. The framework is capable of real-time attack detection and localization with negligible hardware overhead. Experimental results demonstrate the effectiveness of the methodology with timely attack detection and localization while incurring minor area and power overhead (e.g., less than 6% and 4%, respectively). Reference will now be made in detail to the description of the embodiments as illustrated in the drawings, wherein like reference numbers indicate like parts throughout the several views.

System-on-Chip (SoC) design using third-party intellectual property (IP) blocks is a common practice today due to both design cost and time-to-market constraints. These third-party IPs, gathered from different companies around the globe, may not be trustworthy. Integrating these untrusted IPs can lead to security threats. A full system diagnosis for potential security breaches may not be possible due to lack of design details shared by the vendors. Even if they do, any malicious modifications (e.g., hardware Trojans) can still go undetected since it is not feasible to exhaustively explore millions of gates and their combinations that can trigger a certain hardware Trojan. The problem can be aggravated due to the presence of Network-on-Chip (NoC) in today's complex and heterogeneous SoCs. FIG. 1 shows an example of a typical NoC based many-core architecture with heterogeneous IPs connected on a single SoC. Each IP can connect to a router via a network interface. Depending on the selected topology, routers can be arranged across the NoC. As the NoC has direct access to all the components in a SoC, malicious third party IPs can leverage the resources provided by the NoC to attack other legitimate components. It can slow down traffic causing performance degradation, steal information, corrupt data, or inject power viruses to physically damage the chip.

Denial-of-Service (DoS) in a network is an attack preventing legitimate users from accessing services and information. In a NoC setup, DoS attacks can happen from malicious 3rd party IPs (M3PIP) manipulating the availability of on-chip resources by flooding the NoC with packets. The performance of the SoC can heavily depend on a few components. For example, a memory intensive application will send many requests to memory controllers and as a result, routers connected to them will experience heavy traffic. If an M3PIP targets the same node, the SoC performance can suffer significant degradation. Taking the typical DoS attack a step further, Distributed Denial-of-Service (DDoS) is a type of DoS attack where multiple compromised IPs are used to target a singl component causing a DoS attack. This can prevent stopping the attack by merely shutting down one malicious IP. When single or multiple malicious IPs are involved, they are referred to as Dos or DDoS attacks, respectively. With the increased popularity of internet-of-things (IoT) and embedded devices, SoCs are used in many well-defined and time-critical systems. These systems can be one of the main targets of DoS attacks due to their real-time requirements with task deadlines. Early detection of DoS attacks in such systems is important as increased latencies in packet transmission can lead to real-time violations and other consequences.

The importance of NoC security has led to efforts to mitigate DoS attacks in a NoC such as traffic monitoring and formal verification-based methods. Countermeasures for DoS attacks both in terms of bandwidth and connectivity have been studied in the NoC context. One such method tries to stop the hardware Trojan which causes the DoS attack from triggering by obfuscating flits through shuffling, inverting and scrambling. If the Trojan gets triggered, there should be a threat detection mechanism. Previous studies explored latency monitoring, centralized traffic analysis, security verification techniques and design guidelines to reduce performance impacts caused by DoS attacks. In "A security monitoring service for NoCs" by L. Fiorin et al. (Proceedings of the 6th IEEE/ACM/IFIP international conference on Hardware/Software codesign and system synthesis, CODES+ISSS '08, pp. 197-202, October 2008), which is hereby incorporated by reference in its entirety, probes attached to the network interface gather NoC traffic data and send it to a central unit for analysis. Such a centralized method can lead to bottlenecks and a single point of failure. Furthermore, the attack can be launched on this central unit itself to impair the security mechanism. In contrast, the method in "Runtime detection of a bandwidth denial attack from a rogue network-on-chip" by Rajesh Jayashankara-Shridevi et al. (Proceedings of the 9th International Symposium on Networks-on-Chip, NOCS '15, pp. 1-8, September 2015), which is hereby incorporated by reference in its entirety, relies on injecting additional packets to the network and observing their latencies. However, when multiple IPs are communicating with each other, these additional packets can cause congestion and degrade performance as well as introduce performance and power overhead.

DoS attacks have been extensively studied in computer networks as well as mobile ad-hoc networks. In the computer network field, DoS attacks can be categorized as brute force attacks and semantic attacks. Brute force attacks overwhelm the system or the targeted resource with a flood of requests similar to the threat model described below. This can be achieved by techniques such as an attacker sending a large number of Internet Control Message Protocol (ICMP) packets to the broadcast address of a network or by launching a DNS amplification attack. ICMP is a protocol used by network devices to send error messages and operational information. It is common to use botnets rather than few sources to maximize the impact of the attacks. Semantic attacks on the other hand exploit some artificial limit of the system to deny services. Two popular examples are Ping-of-Death and TCP SYN flooding. Techniques such as botnet fluxing, back propagation neural networks and TCP blocking have been used to mitigate these attacks. However, using these techniques in SoC domain is not feasible due to the resource constrained nature and the architectural differences. There are also methods to secure IoT devices such as lightweight encryption and authentication. However, these solutions do not address DoS attacks.

"Automotive Electrical and Electronic Architecture Security via Distributed In-Vehicle Traffic Monitoring" by Waszecki et al. (*IEEE Transactions on Computer-Aided Design of Integrated Circuits and Systems,* 36(11), pp. 1790-1803, November 2017), which is hereby incorporated by reference in its entirety, discussed network traffic monitoring in an automotive architecture by monitoring message streams between electronic control units (ECU) via the controller area network (CAN) bus. Since multiple ECUs are connected on the same bus, it is difficult to localize where the attack is originating from and therefore, the authors present the solution only as a detection mechanism. Moreover, this architecture is bus-based and fundamentally different from a NoC.

Other real-time traffic monitoring mechanisms have also been discussed in non-NoC domains. However, none of the existing techniques explored a lightweight and real-time mechanism to detect potential DoS attacks as well as localize the malicious source(s) in the NoC setup. Here, an efficient method is disclosed that focuses on detecting changes in the communication behavior in real-time to identify DoS attacks. It is a common practice to encrypt critical data in a NoC packet and leave only few fields as plain text. For example, on-chip encryption schemes can utilize authenticated encryption with associated data in which the data is encrypted and associated data (initialization vectors, routing details etc.) are sent as plain-text. This information may be used to monitor communication patterns without analyzing the encrypted contents of the packets. It can also facilitate the detection and localization of DDoS attacks originating from multiple malicious IPs in NoC-based SoCs.

The present disclosure describes a real-time and lightweight DoS/DDos attack detection technique for NoC-based SoCs. The disclosed approach is generalized to the NoC architecture and is valid across deterministic routing protocols and furthermore, has the ability to localize any number of the malicious IPs. The technology is applicable on a wide variety of NoC architectures supporting diverse deterministic routing protocols. The routers store statically profiled traffic behavior and monitor packets in the NoC to detect any violations in real-time. A lightweight approach has been developed to localize the malicious source(s) in real-time once a DoS or DDoS attack is detected is also presented. The threat model and communication model used in the framework is discussed, and the real-time attack detection and localization methodology is described. In addition, experimental results are presented to evaluate the effectiveness of the disclosed approach against different NoC topologies using both real benchmarks and synthetic traffic patterns considering DoS attacks originating from a single malicious IP as well as from multiple malicious IPs. An architecture model similar to one of the commercially available SoCs (e.g., Intel's KNL architecture) was used to evaluate the applicability of the approach.

System and Threat Models

An overview of the threat model and communication system model that can be used in the disclosed security framework will now be presented.

Threat Model.

Figure 2A:
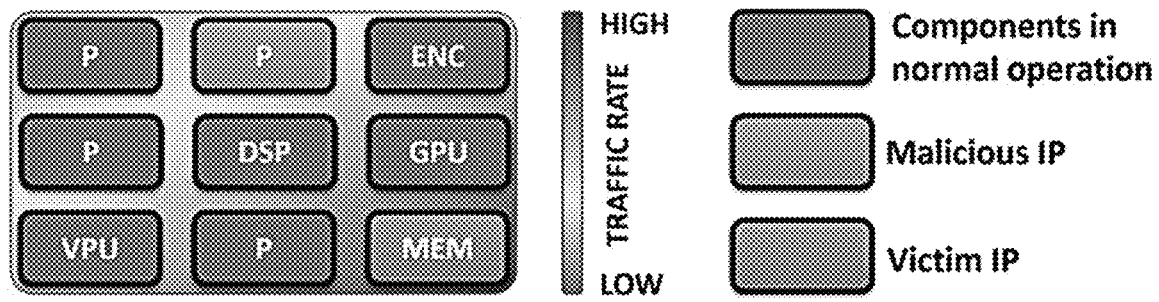
FIG. 2A illustrates an example of a Denial-of-Service (DoS) attack from a malicious intellectual property (IP), in accordance with various embodiments of the present disclosure.

Previous works have explored two main types of DoS attacks on NoCs—(i) an M3PIP flooding the network with useless packets frequently to waste bandwidth and cause a higher communication latency causing saturation; and (ii) a draining attack which makes the system execute high-power tasks and causes fast draining of battery. FIG. 2A illustrates an example of a DoS attack from a malicious IP to a victim IP in a NoC setup with a Mesh topology including processors (P), digital signal processor (DSP), vector processing unit (VPU), graphics processing unit (GPU), encoder (ENC) and memory (MEM). The thermal map of FIG. 2A shows high traffic near the victim IP (MEM). As a result of the injected traffic from the malicious IP to the victim IP (which can be a critical NoC component such as a memory controller), routers in that area of the NoC become congested and responses experience severe delays. The proposed approach can detect both types of DoS attacks.

Figure 2B:
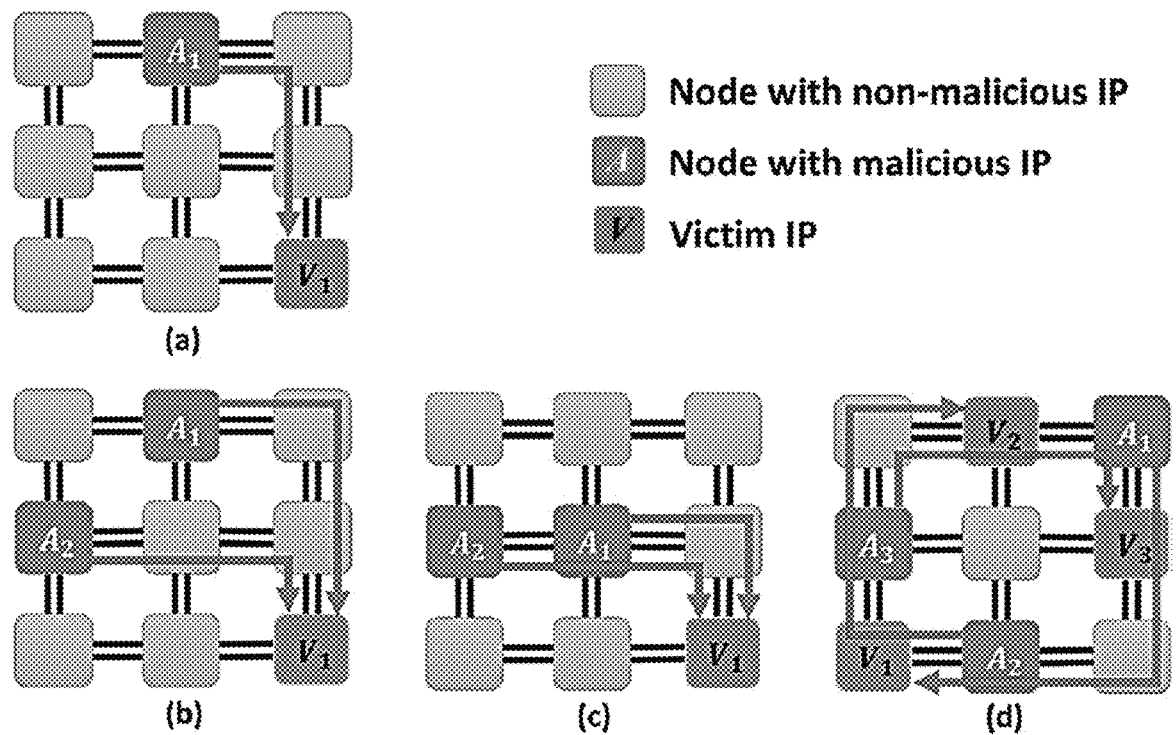
FIG. 2B illustrates examples of malicious and victim IP placement that can lead to different communication patterns, in accordance with various embodiments of the present disclosure.

The threat model is generic and does not make any assumption about the placement or the number of malicious IPs or victim IPs. FIG. 2B shows four illustrative examples of malicious/victim IP placements that can lead to different communication patterns, with the arrows illustrating packet routing paths from malicious to victim IPs. Example (a) of FIG. 2B shows a scenario involving one malicious IP and one victim IP with a single packet routing path. The other three examples represent scenarios where the packets injected from multiple malicious IPs to victim IPs with multiple packet routing paths. Example (b) of FIG. 2B illustrates packets being routed through paths that partially overlap, example (c) of FIG. 2B illustrates packets being routed through paths that completely overlap and example (d) of FIG. 2B illustrates packets being routed through paths that form a loop. In this case, multiple malicious IPs direct attacks against multiple victims. The disclosed approach is capable of both detecting and localizing all the malicious IPs in all these scenarios.

Communication Model.

Figure 3:
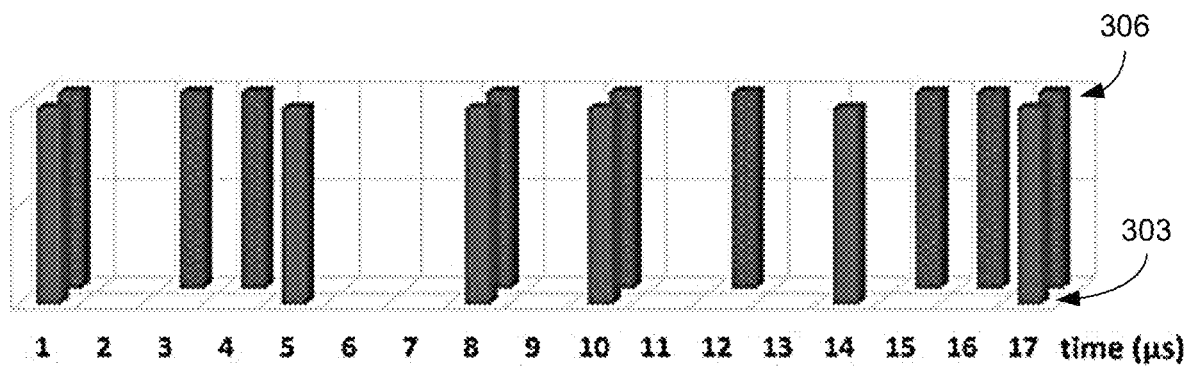
FIG. 3 illustrates examples of event traces of a regular packet stream and a compromised packet stream, in accordance with various embodiments of the present disclosure.

Since each packet injected in the NoC goes through at least one router, it can be identified to be an ideal NoC component for traffic monitoring. The router also has visibility to the packet header information related to its routing. Packet arrivals at a router can be viewed as events and captured using arrival curves. The set of all packets passing through router r during a program execution can be denoted as a packet stream $P_r$. FIG. 3 illustrates an example of two event traces. Two packet streams are shown within a specific time interval of [1, 17] μsecs. The steam $P_r$ (foreground packet stream 303 of six event arrivals at 1, 5, 8, 10, 14 and 17 μs) shows packet arrivals in normal operation and $\tilde{P}_r$ (background packet stream 306 of nine event arrivals at 1, 3, 4, 8, 10, 12, 15, 16 and 17 μs) depicts a compromised stream with more arrivals within the same time interval. The packet count $N_{P_r}[t_a, t_b)$ gives the number of packets arriving at router r within the half-closed interval $[t_a, t_b)$. This can be formally defined using $N_{P_r}(t_a)$ and $N(t_b)$—the maximum number of packet arrivals up to time $t_a$ and $t_b$, respectively—as:

$$\forall t_a, t_b \in \mathbb{R}^+, t_a < t_b, n \in \mathbb{N} : N_{P_r}[t_a, t_b) = N_{P_r}(t_b) - N_{P_r}(t_a). \qquad (1)$$

Unlike Waszecki et al., which monitors message streams at ECUs in a bus-based automotive architecture, this approach monitors packets at routers of NoC based SoC architectures.

Real-Time Attack Detection and Localization

Figure 4A:
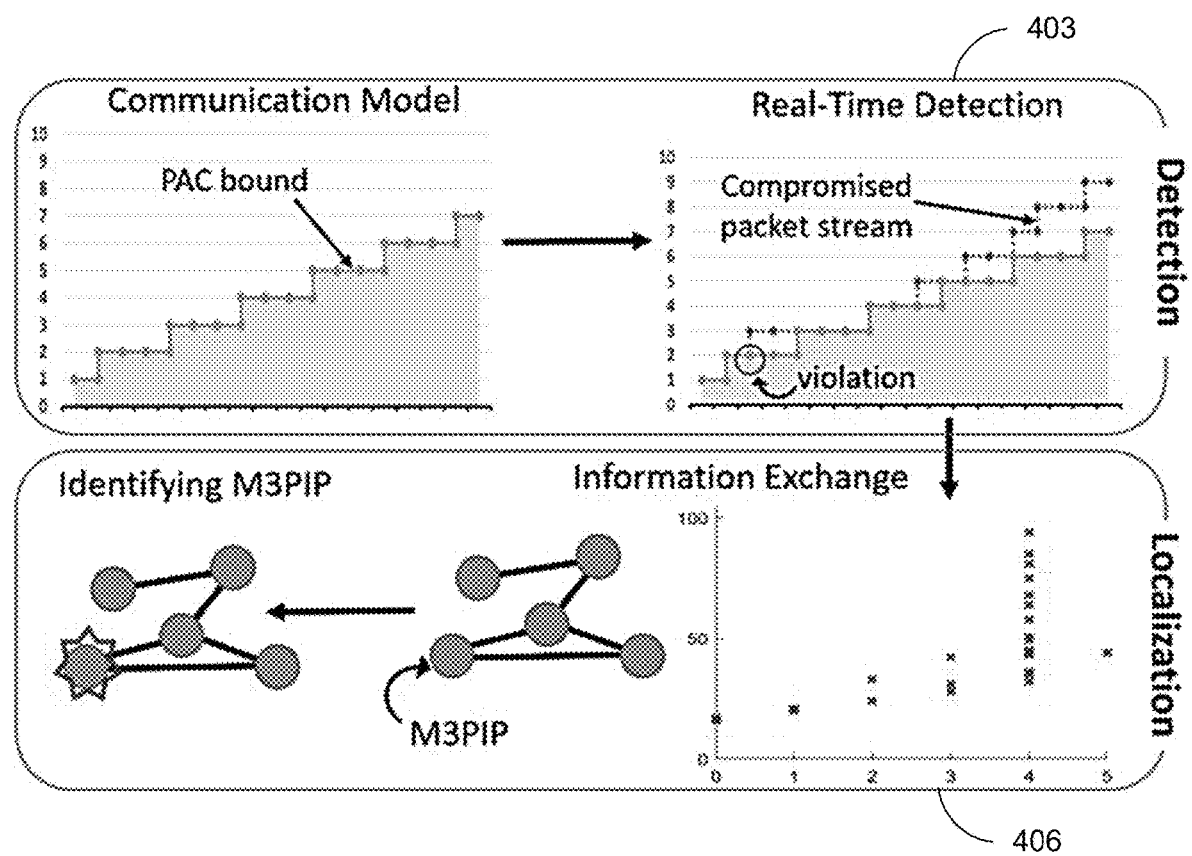
Figure 4B:
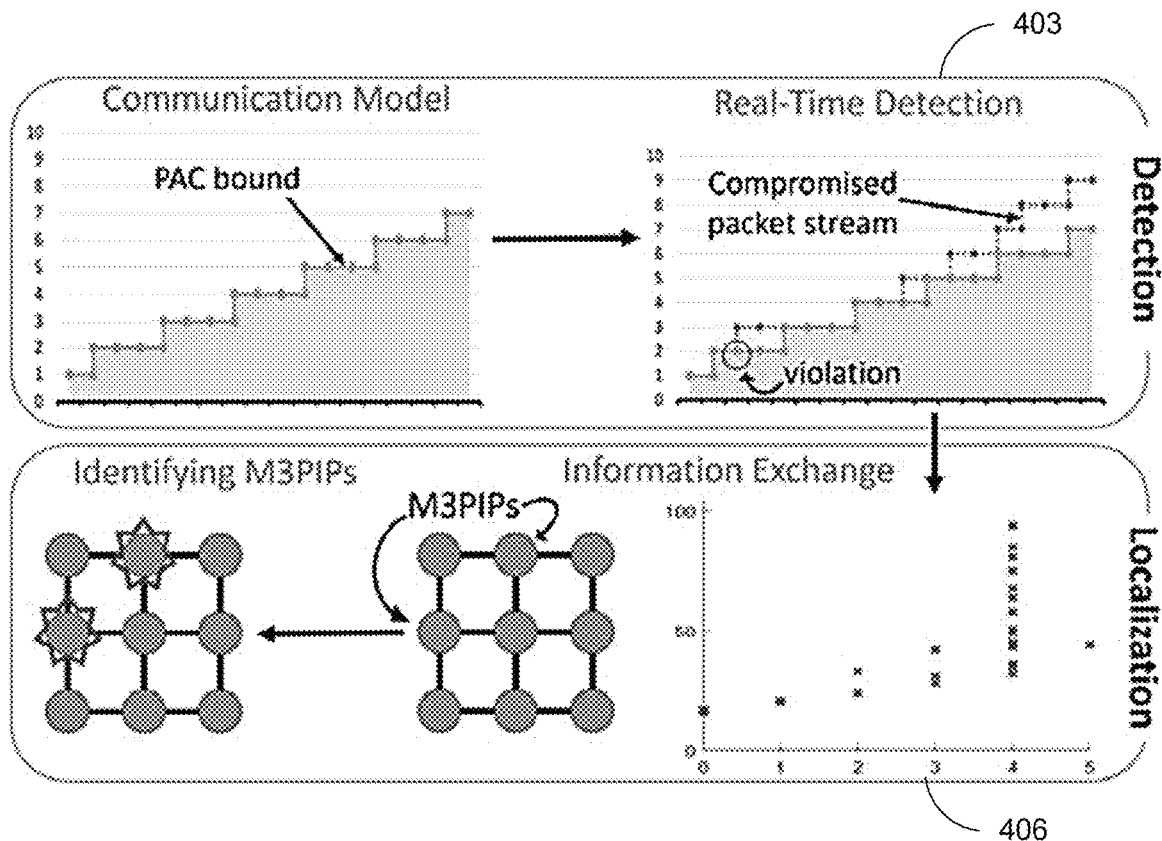

Referring now to FIGS. 4A and 4B, shown is an overview of the proposed security framework to detect and localize DoS/DDoS attacks origination from one or more M3PIPs, respectively. The system specification can be analyzed to obtain the necessary packet arrival curves and detection parameters. These can then be used to design the real-time attack detection and localization framework. The first stage (403) of FIGS. 4A and 4B illustrates the DoS/DDoS attack detection phase while the second stage (406) represents the localization of M3PIP. During the detection phase 403, the network traffic is statically analyzed and communication patterns are parameterized during a design time to obtain the upper bound of packet arrival curves (PAC) at each router and destination packet latency curves (DLC) at each IP. The PACs can then be used to detect violations of communication bounds in real-time. Once a router flags a violation, the IP attached to that router (local IP) takes responsibility of the diagnosis during the localization phase 406. It looks at its corresponding DLC and identifies packets with abnormal latencies. Using the source addresses of those delayed packets, the local IP communicates with routers along that routing path to get their congestion information. The local IP can then localize the M3PIP. Parameterization of the PAC and DLC will now be presented, followed by an elaboration of the real-time DoS/DDoS attack detection mechanism implemented at each router and a description of the localization of M3PIP.

Determination of Arrival Curve Bounds.

To determine the PAC bounds, the packet arrivals can be statically profiled and the upper PAC bound ($\lambda_{P_r}^u(\Delta)$) built at each router. For this purpose, the maximum number of packets arriving at a router within an arbitrary time interval is found $\Delta(=t_b-t_a)$. This can be done by sliding a window of length Δ across the packet stream $P_r$ and recording the maximum number of packets as formally defined by:

$$\lambda_{P_r}^u(\Delta) = \max_{t \geq 0}\{N_{P_r}(t+\Delta) - N_{P_r}(t)\}. \qquad (2)$$

Figure 5:
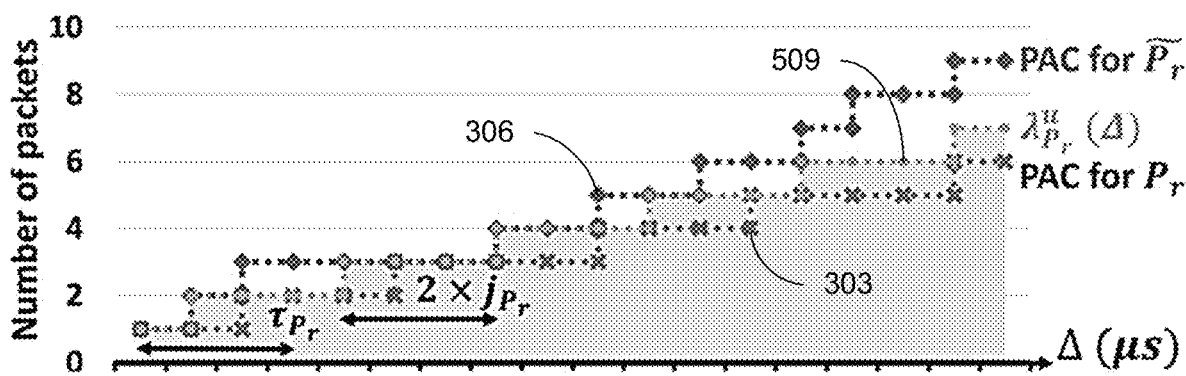

Repeating this for several fixed Δ, constructs the upper PAC bound. These bounds are represented as step functions. A lower PAC bound can also be constructed by recording the minimum number of packets within the sliding window. However, this may be excluded from the discussion since in a DoS attack the only concern is about violating the upper bound. An example PAC bound and two PACs corresponding to the packet streams (303 and 306) in FIG. 3 are shown in FIG. 5. The graph shows the constructed upper ($\lambda_{P_r}^u(\Delta)$) bound of the PACs (509) with the normal operational area shaded. The step functions (303 and 306) show the PACs corresponding to $P_r$ and $\tilde{P}_r$, respectively. During normal execution, the PACs should fall within the shaded area.

While NoCs in general-purpose SoCs may exhibit dynamic and unpredictable packet transmissions, for vast majority of embedded and IoT systems, the variations in applications as well as usage scenarios (inputs) are either well-defined or predictable. Therefore, the network traffic is expected to follow a specific trend for a given SoC. The SoCs in such systems allow for the reliable construction of PAC bounds during the design time. To get a more accurate model, delays that can occur due to NoC congestion, task preemption, changes of execution times and other delays may need to be considered. To capture this, consider the packet streams to be periodic with jitter. The jitter can correspond to the variations of delays. The upper PAC bound for a packet stream $P_r$ with maximum possible jitter $j_{P_r}$ and period $\tau_{P_r}$ can be represented as:

$$\forall \tau_{P_r}, j_{P_r} \in \mathbb{R}^+, \Delta > 0 : \lambda_{P_r}^u(\Delta) = \left\lceil \frac{\Delta + j_{P_r}}{\tau_{P_r}} \right\rceil. \quad (3)$$

The equation captures the shift of the upper PAC bound because of the maximum possible jitter $j_{P_r}$ relative to a nominal period $\tau_{P_r}$. This method of modeling upper PAC bounds is validated by studies in modular performance analysis (MPA) that uses real-time calculus (RTC) as the mathematical basis. MPA is widely used to analyze the best- and worst-case behavior of real-time systems. Capturing packet arrivals as event streams allows the packet arrivals to be abstracted from the time domain and represented in the interval domain (FIG. 5) with almost negligible loss in accuracy.

Determination of Destination Latency Curves.

Similar to the PACs recorded at each router, each destination IP records a DLC. An example DLC at an IP during normal operation is shown in FIG. 6A and during an attack scenario is shown in FIG. 6B. The graph shows the latency against hop count for each packet arriving at a destination IP ($D_i$). The distribution of latencies for each hop count is stored as a normal distribution, which can be represented by its mean and variance. The mean and variance of the latency distribution at destination $D_i$ for hop count k can be denoted by $\mu_{i,k}$ and $\sigma_{i,k}$, respectively. In the example of FIG. 6A, $\mu_{i,4}$ is 31 cycles and $\sigma_{i,4}$ is 2. During the static profiling stage, upon reception of a packet, the recipient IP extracts the source and hop count from the packet header, and plots the travel time (from the source to the recipient IP) against the number of hops. The mean and variance can be derived after all the packets have been received. The large variation in latency at hop count 4 in FIG. 6B compared to FIG. 6A contributes to identifying the malicious IP.

The illustrative example considered one malicious IP four hops away from the victim IP launching the DoS attack. No other IP is communicating with the victim IP in a path that overlaps with the congested path. Therefore, the increased delay is observed only at hop count 4. In general, when multiple IPs send packets with destination $D_i$, and the paths overlap with the congested path, the increased delay will be reflected in several hop counts in the DLC. This scenario was not shown for the ease of illustration. However, such overlapping paths were considered in the experiments.

Real-Time Detection of DoS Attacks.

Detecting an attack in a real-time system involves monitoring of each message stream continuously in order to react to malicious activity as soon as possible. For example, each router should observe the packet arrivals and check whether the pre-defined PAC bound is violated. The attack scenario can be formalized as follows:

$$\exists t \in \mathbb{R}^+ : \lambda_{P_r}^u(\Delta) < \max_{t \geq 0}\{N_{\tilde{P}_r}(t+\Delta) - N_{\tilde{P}_r}(t)\}. \quad (4)$$

The obvious way to detect violations with the upper bound would be to construct the PAC and check to see if it violates the bound as shown in FIG. 5. However, to construct the PAC, the entire packet stream should be observed. In other words, all packet arrivals at a router during the application execution should be recorded to construct the PAC. While it is feasible during upper PAC bound construction at design time, it doesn't lead to a real-time solution. Therefore, an efficient method is needed to detect PAC bound violations during runtime.

To facilitate runtime detection of PAC bound violations, a leaky bucket algorithm, which considers packet arrivals and the history of packet streams, and gives a real-time solution, can be used. Once $\lambda_{P_r}^u(\Delta)$ is parameterized, the algorithm can check the number of packet arrivals within all of the time intervals for violations. FIG. 7 provides an example of an algorithm that outlines the leaky bucket approach where $\theta_{r,s}$ denotes the minimum time interval between consecutive packets in a staircase function s at router r, and $\omega_{r,s}$ represents the burst capacity or maximum number of packets within interval length zero. $\lambda_{P_r}^u(\Delta)$, which is modeled as a staircase function can be represented by n tuples—$(\theta_{r,s}, \omega_{r,s})$, $s \in \{1, n\}$ sorted in ascending order with respect to $\omega_{r,s}$. This assumes that each PAC can be approximated by a minimum on a set of periodic staircase functions.

In FIG. 7, lines 1-4 initializes the timers (TIMER$_{r,s}$) to $\theta_{r,s}$ and packet counters at time zero (COUNTER$_{r,s}$) to corresponding initial packet numbers $\omega_{r,s}$, for each staircase function and packet stream $P_r$. The DoS attack detection process (lines 5-15) basically checks whether the initial packet capacities (COUNTER$_{r,s}$) have been violated. Upon reception of a packet (line 5), the counters are decremented (line 10), and if it falls below zero, a potential attack is flagged (line 12). If the received packet is the first within that time interval (line 7), the corresponding timer is restarted (line 8). This is done to ensure that the violation of PAC upper bound can be captured and visualized by aligning the first packet arrival to the beginning of the PAC bound. When the timer expires, values are changed to match the next time interval (lines 17-20).

As shown by the experimental results, the algorithm of FIG. 7 allows real-time detection of DoS and DDoS attacks under the threat model. As will be discussed below during the overhead analysis, another important observation drastically reduces the complexity of the algorithm allowing a lightweight implementation. The leaky bucket algorithm was proposed to check the runtime conformity of event arrivals in the context of network calculus. Its correctness is proven by "Conforming the runtime inputs for hard real-time embedded systems," by K. Huang et al. (IEEE Design Automation Conference (DAC), pp. 430-436, June 2012), which is hereby incorporated by reference in its entirety.

Real-Time Localization of Malicious IPs.

FIG. 6B shows an example of a DLC during an attack scenario, where all IPs are injecting packets exactly the same way as shown in FIG. 6A except for one M3PIP, which injects a lot of packets to a node attached to a memory controller. Those two nodes are 4-hops apart in the Mesh topology. This makes the latency for 4-hop packets drastically higher than usual. For every hop count, w the traffic distribution is maintained as a normal distribution using $\mu_{i,k}$ and $\sigma_{i,k}$. Once a potential threat is detected at a router, it sends a signal to the local IP. The local IP then looks at its DLC and checks to see if any of the curves have packets that took more than $\mu_{i,k}+1.96\sigma_{i,k}$ time (95% confidence level). One simple solution is to examine source addresses of those packets and conclude that the source with the most number of packets violating the threshold is the M3PIP. However, this simple solution may lead to many false positives. As each IP is distributed and examines the latency curve independently, the IP found using this method may or may not be the real M3PIP (attacker). Therefore, it can be identified as a candidate M3PIP.

Figure 8A:
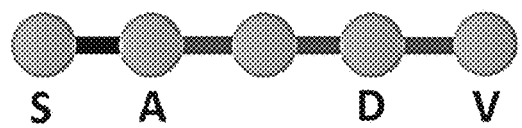
FIGS. 8A-8D illustrate various examples of relative positions of local IP, attacker IP, victim IP and candidate malicious IP in a NoC, in accordance with various embodiments of the present disclosure.
Figure 8B:
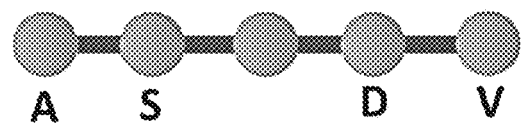
Figure 8C:
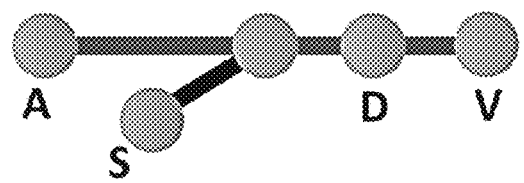

FIGS. 8A-8D show four examples, where the attacker (A) is sending heavy traffic to a victim IP (V), and as a result, the local IP (D) is experiencing large latency for packets from a source (S). The first three examples in FIGS. 8A-8C show examples where the candidate M3PIP (S) is not the real attacker (A). Since a large anomalous latency is triggered by the congestion in the network, the only conclusion obtained by the local IP from its DLC is that at least part of the path from the candidate M3PIP to local IP is congested. The path from attacker (A) to victim (V) can be designated the congested path.

Figure 8D:
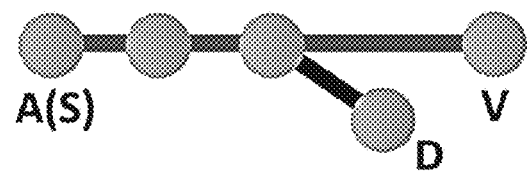

To avoid false positives, a lightweight protocol implemented on the routers is proposed to detect the M3PIP. The source (S) detected by D may or may not be on the congested path (see, e.g., FIGS. 8A and 8C). These false positives of the candidate M3PIP S can be removed with global information of congested paths, by checking the congestion status of the path from S to its first hop. It is certain that S is not the attacker when this path is not congested. However, it may not be possible to tell whether S is the attacker when the path of S is congested. For example, the routers of FIGS. 8B and 8D are both congested, but S is not the attacker in FIG. 8B.

Figure 8E:
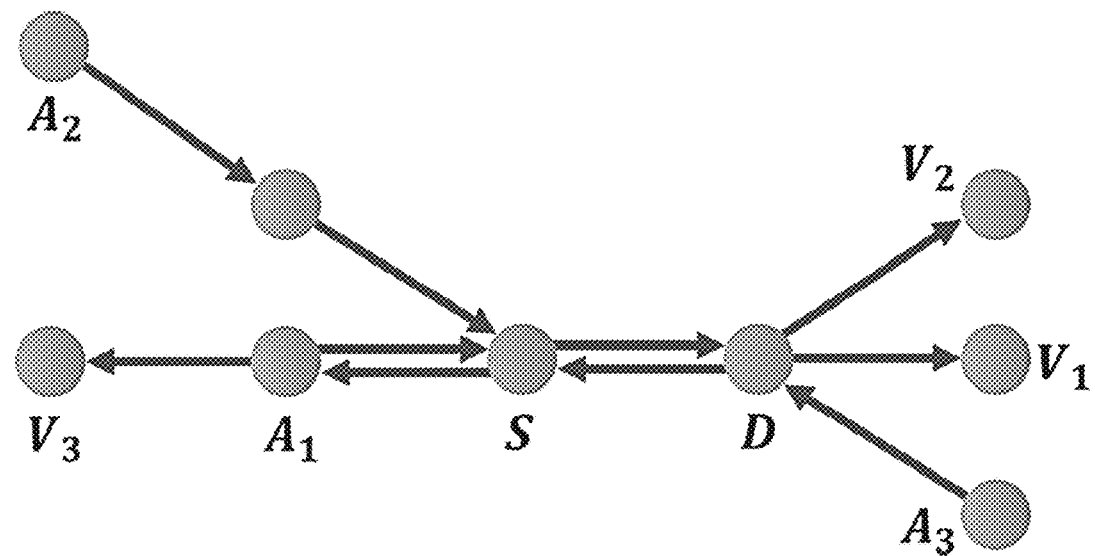
FIG. 8E illustrates an example of relative positions of local IP, attacker IPs, victim IPs and candidate malicious IP in a NoC, in accordance with various embodiments of the present disclosure.

Things get much worse when multiple attackers are present. FIG. 8E illustrates a congestion graph of three attackers. In the example of FIG. 8E, the path from candidate M3PIP S to local IP D is part of all paths along which three different attackers are sending packets to different victims. Define the congested graph as the set of all congested paths and all the routers in the paths. Since each hop connecting two routers comprises two separate uni-directional links, a congested graph is a bi-directional graph as shown in FIG. 8E. In order to detect attackers and avoid false positives, one simple solution would be building the entire congested graph by exchanging information from all the other routers and analyzing the graph to detect the actual M3PIPs. However, this would increase the burden on the already congested paths.

To overcome the bottlenecks, a distributed and lightweight protocol implemented on the routers to detect the attackers is proposed, which can successfully address these challenges. An example of the event handler for all routers for M3PIP localization is shown in algorithm of FIG. 9. The local IP sends the address of a candidate M3PIP to its router. Each router can then maintain a three-state flag for each port to identify the potential attacker. The flag can be 0, 1 and 2 to denote that the potential attacker is undefined; the local IP; or another IP, respectively. A description of the steps of the protocol include:

1) The router R detects an ongoing attack and sends a signal to the local IP (line 4). In FIG. 8, both D and V will send a signal to their local IPs.
2) The local IP D looks at its DLC and responds to its router with a diagnostic message <S,D> indicating the address of the candidate M3PIP S and destination D. The local router then forwards the packet towards S.
3) Each port in each router maintains a three-state flag to identify the attacker. The flag is 0, 1 and 2 to denote the attacker is undefined, local IP or others, respectively. When a diagnostic message <S,D> comes in, R checks if the candidate M3PIP S is the local IP. If yes and its flag is not set yet, it will set the flag to be 1 (line 9). If S is not the local IP, it first finds out its neighbor N which sits in the path from S to R. If the one-hop path from N to R is congested, it sends the message to N (line 19) and sets the flag to 2, to indicate other IP as a potential attacker (line 20). Except for these two scenarios, the received message is a false positive and no action is taken (line 12 and 23), which will be explained in the examples. Note that the flag cannot decrease except for the reset signal which sets it to undefined (line 2). Therefore, if a diagnostic message already mentioned that other IPs may be the potential attackers, a new diagnostic message from the same port claiming that the local IP is the attacker will be ignored.
4) Each router maintains a timer. The timer starts as soon as any one of the router ports receive a diagnostic message. A pre-defined timeout period is used by each router. If the flag of any port is 1 after timeout, it broadcasts a message alerting that its local IP (line 28) is the attacker. Finally, a reset signal is triggered (line 29).

Next, an example is presented to show that the approach works when a DoS attack is originating from only one M3PIP in the NoC, followed by a description of how the proposed approach works in the presence of multiple M3PIPs mounting a DDoS attack.

DoS Attack by a Single M3PIP:

The scenario of FIG. 8B is used as the example to illustrate how the approach can localize the attacker when a DoS is caused by a single M3PIP. The router of S will receive two messages, one from the router of D saying that its local IP is a candidate M3PIP (or potential attacker), and the other from the router of V saying that A is a candidate M3PIP, i.e., <S,D> and <A, V>. Depending on the arrival time of these two messages, there are two scenarios: (a) <S, D> comes first, and (b)<A, V> comes first. In the first scenario (a) where <S, D> comes first, the router of S will change the flag of the corresponding port to "1" to denote that the local IP is the potential attacker. Then, the router of S receives another message <A,V> from the router of V through the same port saying that A is the potential attacker. In this example A is also the neighbor N. As the one hope path from A to S is congested, the flag will be set to "2" to denote that the other IP is the potential attacker. Then, the router of S will receive <S, D> through the same port. As the flag is already set to 2, the received message is a false positive (line 12). When a timeout occurs, nothing happens at the router of S. However, the router of A receives only the message from V indicating that its local IP is the potential attacker and its flag remains "1" when the timeout occurs. Therefore, a broadcast is sent indicating that A is the attacker.

For the case in FIG. 8A, the router of A will receive a message from the router of D indicating that S is a candidate M3PIP. However, when the router of A checks the congestion status of the one-hop path from S to A, it will find out that the path is not congested. Therefore, the message is a false positive (line 23), and the router of A will not change its flag. In other words, the flag of A will be set to 1 after receiving the message from the router of V, and will not be changed by the message from D to S. After timeout, A will be identified as the attacker.

DDoS Attack by Multiple M3PIPs:

Before giving an illustrative example of how the approach localizes attacks by multiple malicious IPs, the correctness of the approach can be shown by proving the following theorem.

Theorem 1. If the congested graph contains no loops, the algorithm of FIG. 9 can localize at least one attacker.

Proof.

Merge multiple diagnostic messages with the same destination as one message and ignore all false positive messages detected in line 12 and line 23 of the algorithm of FIG. 9. Define message $\varphi_i$ as a diagnostic message which points out that $A_i$ is a candidate M3PIP. Consider the port of any attacker $A_i$ that receives message $\varphi_i$. Such a port always exists in a DDoS attack scenario due to the fact that victim $V_i$ will send a message $\varphi_i$ to $A_i$ saying that $A_i$ is a candidate M3PIP. If $\varphi_i$ is the only message received from this port, the algorithm can declare $A_i$ as an attacker.

The algorithm fails only when all routers connected to the attackers have flags set to either 0 or 2 in each of their ports as illustrated in the algorithm of FIG. 9. This can only happen when each port that receives a diagnostic message, receives another diagnostic message which causes the flag to be set to 2. Assume that a port in the router of $A_i$ receives messages $MS_i = \{\varphi_i, \varphi_j, \ldots\}$. It will digest the message $\varphi_i$ and send out the remaining ones. Construct a diagnostic message path in the following way. First, add $A_i$ to the path. Then, select any message from $MS_i$ other than $\varphi_i$, e.g., $\varphi_j$. Next, follow the diagnostic message path from $A_i$ to $A_j$, and add all routers to the path. By the same process, select one message other than $\varphi_j$ from $MS_j$, e.g., $\varphi_k$.

Next, follow the path from $A_j$ to $A_k$. This can be done one by one since for every message set $MS_u$ at attacker $A_u$, there is at least one message other than $\varphi_u$ to select from. Therefore, the constructed diagnostic message path contains an infinite number of attackers, as shown in FIG. 10 which is an example of a diagnostic message path constructed by following the flow of a diagnostic message in each attacker. The infinite number of attackers implies that this path contains repeated attackers. Without loss of generality, assume that $A_k = A_i$. Since $A_i$ cannot be sending out diagnostic messages $MS_i$ through the same port that receives $MS_i$, the diagnostic path must form a loop. It is easy to see that diagnostic paths are the reverse of congested paths. As a result, there exists a loop in the congested graph, which contradicts the assumption made. Hence, Theorem 1 is proven.

Thus, there always exists a port of the router connected to attacker $A_i$ which receives only one diagnostic message $\varphi_i$ given that there are no loops. This is a sufficient condition to detect $A_i$ using the algorithm of FIG. 9. Using this approach for localizing multiple malicious IPs gives rise to three cases that behave differently depending on how the M3PIPs are placed.

Case 1:

If the congested paths do not overlap, all M3PIPs will be localized in one iteration using the process outlined above. This is the best-case scenario for the approach and localizes M3PIPs in minimum time.

Case 2:

If at least two paths overlap, it will need more than one iteration to localize all M3PIPs. To explain this scenario, an illustrative example is shown in FIGS. 11A-11C. FIG. 11A shows the placement of the four M3PIPs ($A_1$, $A_2$, $A_3$, $A_4$) attacking the victim IP (V). Placement of the attackers and victim causes an overlap of congested paths of attackers $A_2$ and $A_3$. Once the attack is detected, in the first iteration attackers $A_1$, $A_3$ and $A_4$ are detected as shown in FIG. 11B. Due to the nature of the approach, $A_2$ is not marked as an attacker. This is caused by two diagnostic messages going in the paths V→$A_2$ and V→$A_3$. The router of $A_2$ will receive a message from the router of V saying that its local IP is a candidate M3PIP. It will change the flag of the corresponding port to 1 to denote that $A_2$ is the potential attacker. $A_2$ will receive another message from the router of V through the same port saying that $A_3$ is a candidate M3PIP. In this example, $A_3$ is also the neighbor of $A_2$. As the one-hop path from $A_3$ to $A_2$ is congested, the flag will be set to 2, denoting that the attacker is some other IP.

When timeout occurs, nothing happens at the router of $A_2$. However, the router of $A_3$ receives only the message from V indicating that its local IP is the potential attacker and its flag remains 1 when timeout occurs. Therefore, $A_3$ is detected as an attacker whereas $A_2$ is not. In the case of $A_1$ and $A_4$, there is no overlap of congested paths and the two attackers are detected without any false negatives. Once the system resumes with only $A_2$ being malicious, the attacker will be detected and localized in the second iteration. FIG. 11C shows the attackers detected from the second interation. This case consumes more time since an additional detection phase is required to localize all M3PIPs. The number of iterations will depend on how many overlapped paths can be resolved at each iteration. In the worst case (where all congested paths can overlap and each iteration will resolve one path), the number of iterations will equal to the number of M3PIPs. However, the approach is guaranteed to localize all M3PIPs.

Case 3:

The proof of Theorem 1 had the assumption that the congested graph contains no loops. Therefore, using the approach as it is, will not lead to localizing all M3PIPs if the congested graph forms a loop as shown in FIGS. 12A and 12B. FIG. 12A illustrates how three attackers cooperate and construct a loop in the congested graph. The algorithm of FIG. 9 will fail to detect any attacker in the loop. One solution is that any router in the congested loop can randomly "stop working" and resume after a short while. By breaking the loop, the approach will detect attackers with the new congested graph. The router "stopping work" can be triggered by the system observing that a DDoS attack is going on (during the detection phase), but no M3PIPs being localized. FIG. 12B illustrates, when a router randomly "stops working", an attacker $A_2$ is revealed after breaking the loop.

In summary, the approach can detect one or more M3PIPs at each iteration depending on whether congested paths overlap. After detecting attackers(s) in the congested graph, their local router(s) can remove the attacker by dropping all its packets. Then, the process can be repeated with a new congested graph if more attackers exist. The approach continues to find more attackers until either all attackers have been found, or the congested graph forms a loop, which can be handled using the method outlined above (Case 3).

It can be seen that the extra work for the router is minimal in this protocol because all computations are localized. It only needs to check the congestion status of connected paths (one hop away) and compute the flag which has two bits for each port. The protocol relies on the victim to pinpoint the correct attackers and the routers to remove false positives. The timeout should be large enough for the victim to send messages to all the routers in the path of the attack. In practice, it can be the maximum communication latency between any two routers. The total time from detection to localization is the latency for packet traversal from the victim to attacker plus the timeout. Therefore, the time complexity for localization is linear in the worst case with respect to the number of IPs a. It is important to note that most of the time, the diagnostic message path is the reverse of the congested path, and therefore, is not congested.

Experimental Results

The feasibility of the disclosed real-time approach is examined by presenting experimental results and discussing the overheads associated with it. DoS attacks caused by a single M3PIP have been explored as well as multiple M3PIPs using the architecture shown in FIG. 13, which illustrates M3PIP and victim IP placement when running tests with real benchmarks on a 4×4 Mesh NoC. The efficiency of the approach was evaluated in an architecture model similar to one of the commercially available SoCs.

Experimental Setup.

The system was tested on 5 real and 40 synthetic traffic traces. The synthetic traffic traces were generated by the cycle-accurate full-system simulator—gem5. The interconnection network was built on top of a "GARNET2.0" model that was integrated with gem5. The default gem5 source was modified to include the detection and localization algorithms. The experiments were carried out using several synthetic traffic patterns (uniform random, tornado, bit complement, bit reverse, bit rotation, neighbor, shuffle, transpose), topologies (Point2Point (16 IPs), Ring (8 IPs), Mesh4×4, Mesh8×8) and XY routing protocol were evaluated to illustrate the efficiency of the proposed approach across different NoC parameters. A total of 40 traffic traces were collected using the simulator by varying the traffic pattern and topology. Synthetic traffic patterns were only tested using one M3PIP in the SoC launching the DoS attack and an application instance running in 50% of the available IPs. These traffic traces acted as test cases for the algorithms. The placement of the M3PIP, victim IP and IP(s) running the traffic pattern were chosen at random for the 40 test cases.

The approach was also evaluated using real traffic patterns based on 5 benchmarks (FFT, RADIX, OCEAN, LU, FMM) from the SPLASH-2 benchmark suite in Mesh 4×4 topology. Traffic traces from real traffic patterns were used to test both single-source DoS attacks as well as multiple-source DDoS attacks. The attack was launched at a node connected to a memory controller. Relative placements of the M3PIP and victim IP used to test the single-source DoS attack were the same as for the synthetic traces running on Mesh 4×4 topology (test case IDs 1 through 5 in FIG. 15). For the DDoS attack involving multiple M3PIPs, tests were run using the same set of benchmarks and topology with the victim and M3PIP placements as shown in FIG. 13, which shows the M3PIP and victim IP placement when running the test with the real benchmarks on a 4×4 Mesh NoC. The placement captures both Case 1 and Case 2 discussed above. Each node with a non-malicious IP ran an instance of the benchmark while the four nodes in the four corners were connected to memory controllers. The jitter for all applications was calculated using the method proposed in "Priority assignment for event-triggered systems using mathematical programming," by M. Lukasiewycz et al. (IEEE Design, Automation & Test in Europe Conference & Exhibition (DATE). pp. 982-987, March 2013), which is hereby incorporated by reference in its entirety.

Efficiency of Real-Time DoS Attack Detection.

An illustrative example to show how the parameters associated with the leaky bucket algorithm of FIG. 7 are calculated and used in attack detection is presented.

Overhead Analysis.

An important observation allows the reduction of the number of parameters required to model the PACs and as a result, allows for the implementation of a lightweight scheme with much less overhead. The model in Equation (3) is derived using the fact that the packet streams are periodic with jitter. For message streams with similar arrival characteristics, the PACs can be parameterized by using only worst case jitter $j_{P_r}$, period $\tau_{P_r}$ and an additional parameter $\epsilon_r$ which denotes the packet counter decrement amount. The relationships between these parameters are derived in "Analytic real-time analysis and timed automata: a hybrid method for analyzing embedded real-time systems" by K. Lampka et al. (Proc. of $9^{th}$ ACM Int. Conf. on Embedded Software, pp. 107-116, October 2009), which is hereby incorporated by reference in its entirety, as:

$$\theta_r = \text{greatest\_common\_divisor}(\tau_{P_r}, \tau_{P_r} - j_{P_r}), \quad (5a)$$

$$\omega_r = 2 \times \epsilon_r - \frac{\tau_{P_r} - j_{P_r}}{\theta_r}, \quad (5b)$$

$$\epsilon_r = \frac{\tau_{P_r}}{\theta_r}. \quad (5c)$$

To use these parameters, the only changes to the algorithm of FIG. 7 are at line 10 (COUNTER$_{r,s}$=COUNTER$_{r,s}$−$\epsilon_r$) and one tuple per packet stream instead of n tuples (s∈{1}). The illustrative example is based on this observation.

Illustrative Example.

Figure 14:
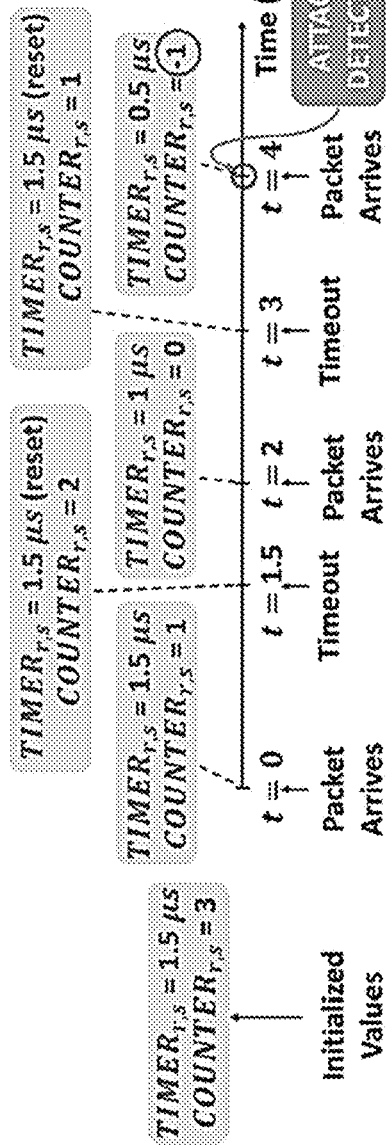
FIG. 14 illustrates an example of parameter changes in the leaky bucket algorithm with packet arrivals and timeouts, in accordance with various embodiments of the present disclosure.

Consider the example packet streams shown in FIG. 3. Assume that the packet steam $P_r$ has a period $\tau_{P_r}$=3 μs and jitter $j_{P_r}$=1.5 μs. During an attack scenario, this stream is changed to stream $\tilde{P}_r$ with $\tau_{\tilde{P}_r}$=2 μs and no jitter. Using these values in Equation (5) will give $\theta_r$=1.5 μs, $\omega_r$=3 and $\epsilon_r$=2, which are the parameters used in the leaky bucket algorithm. Therefore, COUNTER$_{r,s}$ is initialized with 3 (line 3, line 18) and decremented by 2 at each message arrival (line 10). TIMER$_{r,s}$ is initialized to 1.5 μs (line 2, line 19). Using these values and running the detection algorithm during the attack scenario will lead to a detection time of 4 μs. FIG. 14 illustrates an example of parameter changes in the leaky bucket algorithm with packet arrivals and timeouts, showing the values of the parameters changing with each packet arrival and timeout leading to the detection of the attack at t=4 μs.

Figure 15:
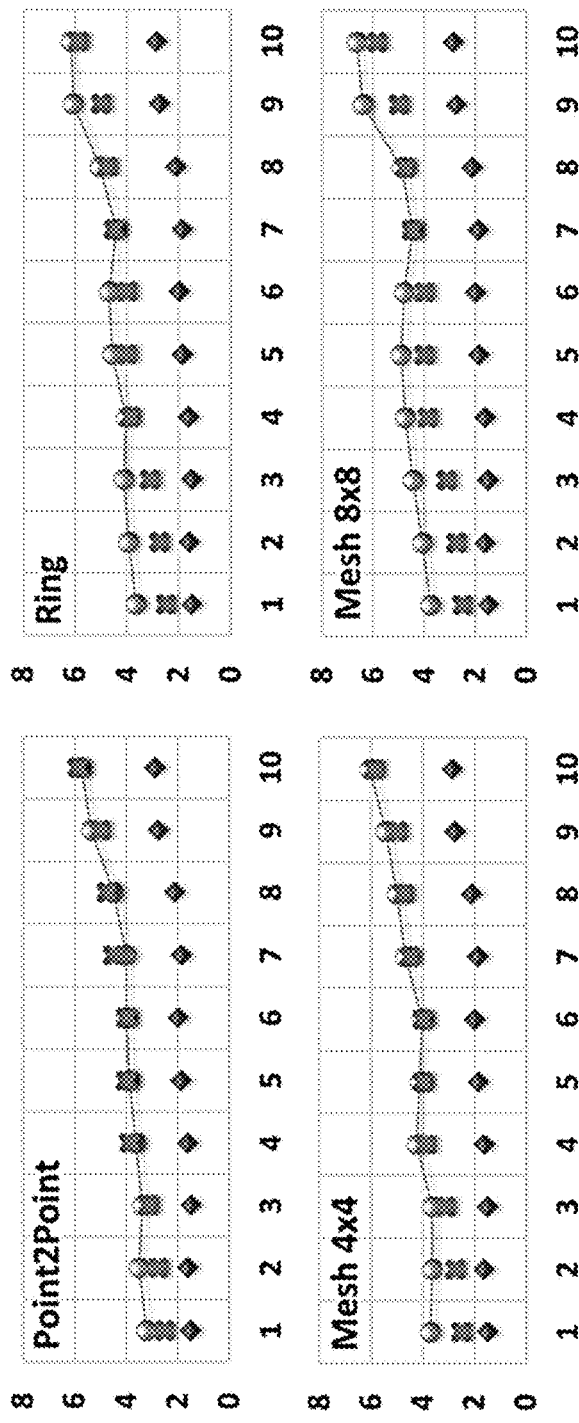
FIGS. 15-19 illustrate comparisons of attack detection and localization times for different network topologies, in accordance with various embodiments of the present disclosure.

The experimental evaluation follows the same process as the illustrative example using the experimental setup. Referring to FIG. 15, shown are examples of the detection time across different topologies for synthetic traffic traces. The 40 test cases were divided into different topologies, 10 each. The packet stream periods were selected at random to be between 2 and 6 microseconds. Attack periods were set to a random value between 10% and 80% of the packet stream period. The detection time was approximately twice the attack period in all topologies. This is expected according to the algorithm of FIG. 7 and consistent with the observations in Waszecki et al.

In addition to the time taken by the leaky bucket approach, the detection time was affected by the topology as well. When the victim is far from the malicious IP, the NoC traversal delay also contributes to the detection time. This is evident from FIG. 15, which shows the Point2Point topology where every node is one hop away resulting in less latency and the Mesh 8×8 with 64 cores where some nodes can be multiple hops away. The topology mainly affects attack localization time due to the number of hops from detector to attacker. But for detection, topology plays a relatively minor role since the routers are connected to each IP and detection mechanism neither takes into account the source nor the destination of packets. The routers only look at how many packets arrived in a given time interval. Also note that any router in the congested path can detect the attack, not only the router connected to the victim IP. A combination of these reasons have led to the topology playing a relatively minor role in attack detection time. These results confirm that the proposed approach can detect DoS attacks in real-time.

Figure 16:
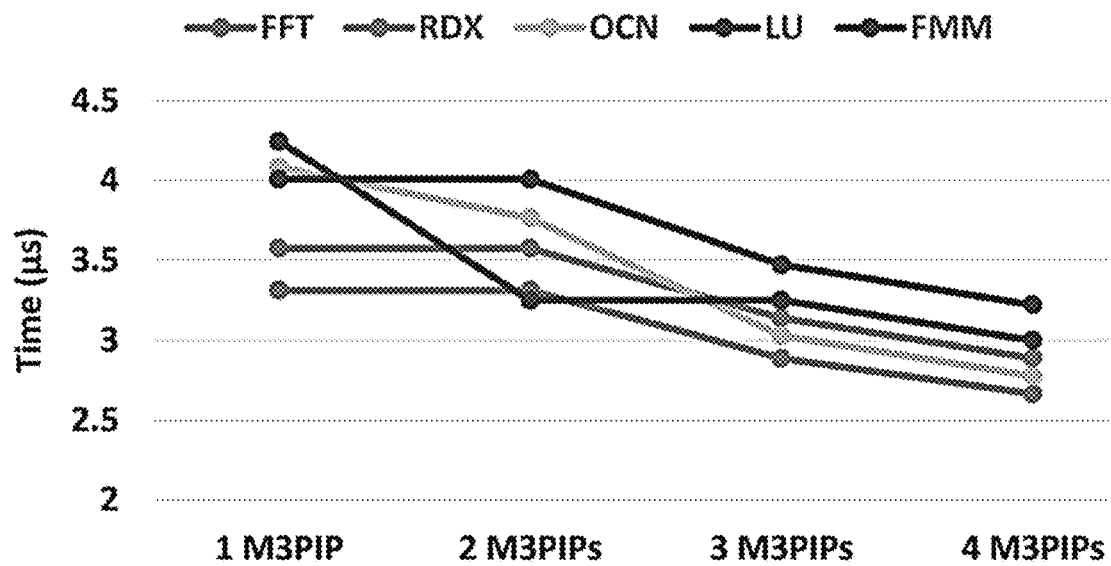
Figure 17:
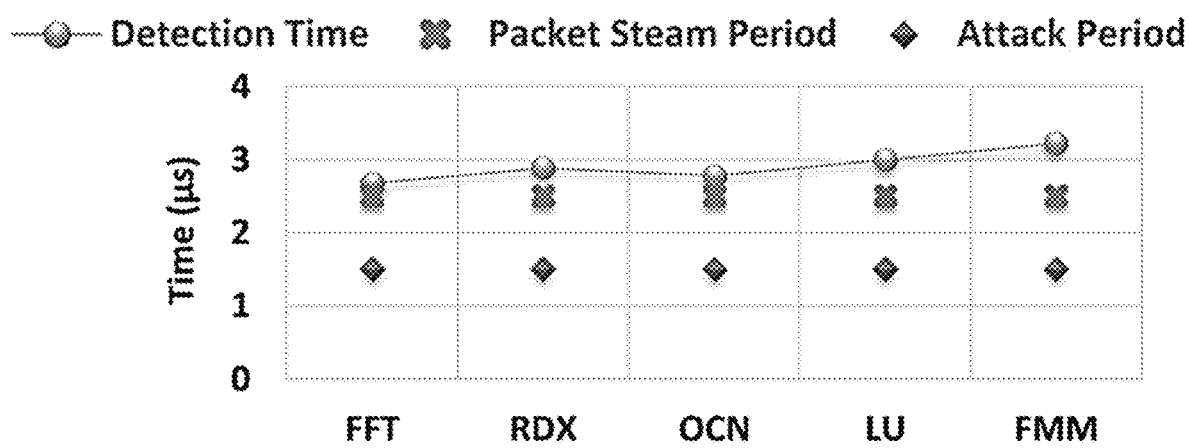

Results for DDoS attack detection in the presence of multiple attacking M3PIPs are shown in FIG. 16 and FIG. 17. FIG. 16 illustrates attack detection time when running real benchmarks with the presence of different numbers of M3PIPs and FIG. 17 illustrates attack detection time when running real benchmarks with the presence of four M3PIPs. For all of these experiments, packet stream period is fixed at 2.5 µs and attack period is set to 1.5 µs. FIG. 16 shows detection time variation in the presence of different number of IPs across benchmarks. The time to detect an ongoing attack in the multiple M3PIP scenario is typically less than the single M3PIP scenario. When more IPs are malicious, the detection time shows a decreasing trend. This is expected since multiple attackers flood the NoC faster and cause PAC bound violations quicker. To compare detection time with packet stream period and attack period, the detection time variation in the presence of four M3PIPs across benchmarks is shown in FIG. 17.

Efficiency of Real-Time DoS Attack Localization.

Figure 18:
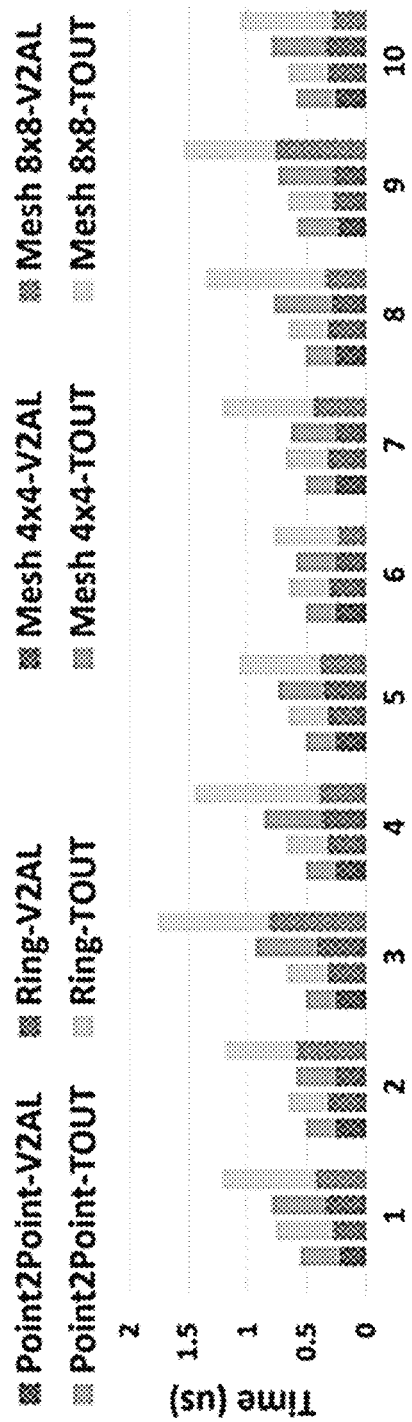

The efficiency of attack localization can be measured by measuring the time it takes from detecting the attack to localizing the malicious IP. According to the disclosed protocol, this is mainly dominated by the latency for packet traversal from victim to attacker (V2AL) as well as the timeout (TOUT) described above. FIG. 18 shows these statistics using the same set of synthetic traffic patterns for the single M3PIP scenario.

The experimental setup for the localization results corresponds to the experimental results for the detection results in FIG. 15. Unlike the detection phase, since the localization time depends heavily on the time it takes for the diagnostic packets to traverse from the IPs connected to the routers that flagged the attack to the potentially malicious IPs, the localization time varies for each topology. For example, in a Point2Point topology, localization needs diagnostic message to travel only one hop, whereas a Mesh8×8 topology may require multiple hops. Therefore, localization is faster in Point2Point compared to Mesh8×8 as shown in FIG. 18. The localization time is less compared to detection time because the localization process completes once the small number of diagnostic packets reach all the potentially malicious IPs, whereas detection requires many packets before violating a PAC bound during runtime.

Figure 19:
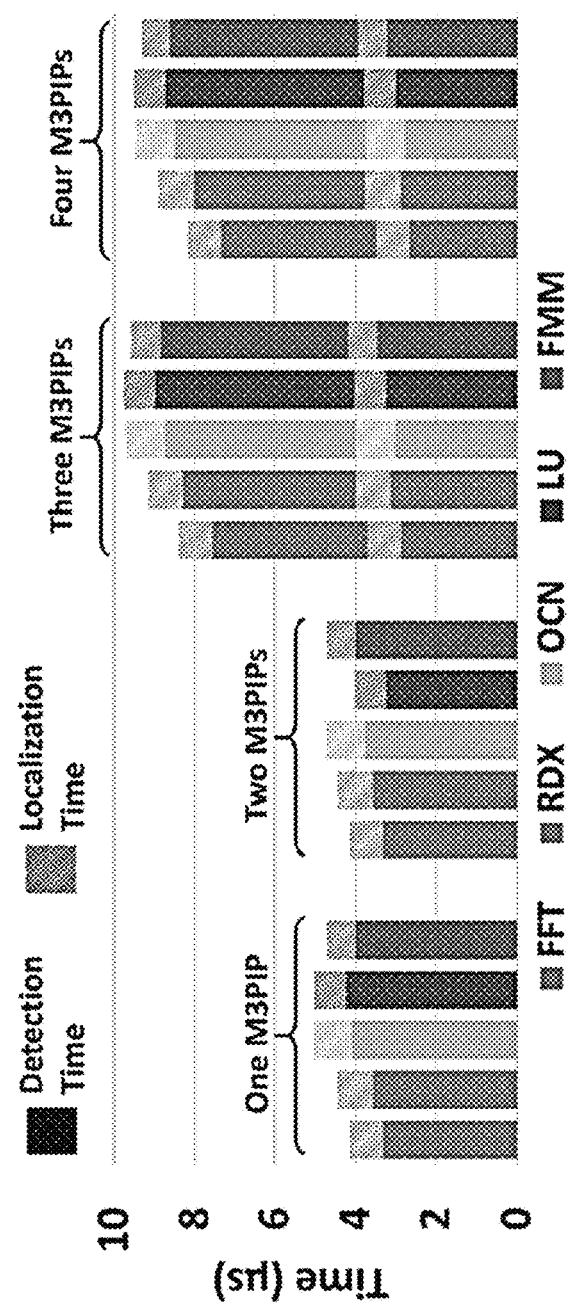

Results for DDoS attack localization in the presence of multiple M3PIPs when running real benchmarks is shown in FIG. 19. Similar to the experiments done for DDoS attack detection efficiency, localization results are shown for one, two, three and four M3PIPs attacking the victim IP at the same time. The time is measured as the time it takes since launching the attack, until the localization of all M3PIPs. Once the first iteration of localization and detection is complete, the attack has to be detected again before starting the localization procedure. Therefore, the y-axis shows detection as well as localization time. For clarity of the graph, unlike in FIG. 18, total localization time is shown for each iteration rather than dividing the localization time as V2AL and TOUT. For both one and two M3PIP scenarios, only one iteration of detection and localization is required. When the third M3PIP is added, the two congested paths from victim to second M3PIP and from victim third M3PIP overlap. Therefore, only the first and third M3PIPs are localized during the first iteration leaving the second M3PIP to be detected during the second iteration. Similarly, in the four M3PIP scenario, first, third and fourth M3PIPs are localized during the first iteration and the second M3PIP, during the second iteration. This is consistent with the previous discussion. The results show that both detection and localization can be achieved in real-time. If a system utilizes only detection, the architecture of our framework allows easy decoupling of the two steps.

Overhead Analysis.

The overhead is caused by the additional hardware that is needed to implement the DoS attack detection and localization processes. The detection process utilizes additional hardware components and memory implemented at each router to monitor packet arrivals as well as store the parameterized curves. The localization process uses DLCs stored at IPs and the communication protocol implemented at the routers. FIG. 20 shows an overview of how the security components can be integrated into the NoC components. The observation made in Experimental Setup Section allows the number of parameters needed to model the PACs to be reduced, and as a result, reduces the additional memory demands and improves performance. The power, performance and area overhead of the optimized algorithms will now be evaluated.

Performance Overhead:

In this work, the 5-stage router pipeline (buffer write, virtual channel allocation, switch allocation, switch traversal and link traversal) implemented in gem5 was used. The computations related to the leaky bucket algorithm can be carried out in parallel to these pipeline stages once separate hardware is implemented. Therefore, there is no additional performance penalty for DoS attack detection.

During the localization phase, the diagnostic messages do not lead to additional congestion for two reasons. (1) As shown in the algorithm of FIG. 9, the diagnostic message can be transmitted along the reverse direction of the congested path. Since routers utilize two separate uni-directional links, the diagnostic messages are not sent along the congested path. (2) While it is unlikely, it is possible for multiple M3PIPs to carefully select multiple victims to construct a congested path in both directions. Even in this scenario, the number of diagnostic messages is negligible. This is because when an attack is flagged by the detection mechanism, diagnostic messages are sent to the source IPs which have violated the DLC threshold. Since the number of such source IPs can be at most the number of IPs communicating with the node that detected the attack, the performance impact by diagnostic messages is negligible.

Hardware Overhead:

Overhead due to modifications in the router, packet header as well as local IPs, is considered as outlined below.

Router: The proposed leaky bucket algorithm is lightweight and can be efficiently implemented with just three parameters per PAC bound as discussed above. The localization protocol utilizes two-bit flags at each port resulting in 10 bits of memory per router in the Mesh topology. To evaluate the area and power overhead of adding the distributed DoS attack detection and localization mechanism at each router, the RTL of an open-source NoC Router was modified. The design was synthesized with the 180 nm GSCLib Library from Cadence using the Synopsys Design Compiler. It gave area and power overheads of about 6% (5.93%) and about 4% (3.87%), respectively, compared to the default router.

Packet Header: In a typical packet header, the header flit contains basic fields such as source, destination addresses and the physical address of the (memory) request. Some cache coherence protocols include special fields such as flags and timestamps in the header. If the header carries only the basic fields, the space needed by these fields is much less compared to the wide bit widths of a typical NoC link. Therefore, most of the available flit header space goes unused. Some of these bits were used to carry the timestamp to calculate latency. This eliminates the overhead of additional flits, making better utilization of bits that were being wasted. If the available header bit space is not sufficient, adding an extra "monitor tail flit" is an easily implementable alternative. In most NoC protocols, the packet header has a hop count or time-to-live field. Otherwise, it can be derived from the source, destination addresses and routing protocol details.

Local IP: The DLPs are stored and processed by IPs connected to each node of a NoC. Since the IPs have much more resources than any other NoC component, the proposed lightweight approach has negligible power and performance overhead. $\mu_{i,k}+1.96\sigma_{i,k}$ was stored as a 4-byte integer for each hop count. Therefore, the entire DLP at each IP can be stored using 1×m parameters where m is the maximum number of hops between any two IPs in the NoC. It gives a total memory space of just 1×m×4 bytes.

The evaluations demonstrate that the area, power and performance overhead introduced by our approach is negligible.

Case Study with Intel KNL Architecture

In the previous section, the disclosed approach was applied using a regular 4×4 Mesh architecture (FIG. 13). In order to demonstrate the applicability of the approach across NoC architectures, in this section, the efficiency of the approach will now be evaluated in an architecture model similar to one of the commercially available SoCs—Intel's KNL architecture. Knights Landing (KNL) is the codename for the second-generation Xeon-Phi processor introduced by Intel. The architecture was modeled on gem5 according to a validated simulator model and used to show results for both DDoS attack detection and localization.

Referring to FIG. 21, shown in an overview of the KNL architecture together with an example of MCDRAM miss in cache memory mode and all-to-all cluster mode: (1) L2 cache miss. Memory request sent to check the tag directory, (2) request forwarded to MCDRAM which acts as a cache after miss in tag directory, (3) request forwarded to memory after miss in MCDRAM, and (4) data read from memory and sent to the requester.

The KNL architecture, which is designed for highly parallel workloads, provide 36 tiles interconnected on a Mesh NoC. It can implement a directory-based cache coherence protocol and supports two types of memory (i) multi-channel DRAM (MCDRAM) and (ii) double data rate (DDR) memory. The architecture gives the option of configuring these two memories in several configurations which are called memory modes. Furthermore, the affinity between cores, directories and memory controllers can be configured in three modes which are known as cluster modes. The memory and cluster modes allow configuration of the architecture depending on the application characteristics to achieve optimum performance and energy efficiency. Each combination of memory and cluster modes cause different traffic patterns in the NoC. The goal is to simulate the NoC traffic behavior in a realistic architecture and evaluate how our security framework performs in it.

A similar architecture was modeled on gem5 to evaluate how the DDoS attack detection and localization framework will perform in a realistic setup. The gem5 model is adopted from previous work which validated the gem5 simulator statistics with the actual hardware behavior of a Xeon Phi 7210 platform. In this model, 32 tiles connect on a Mesh NoC. Each tile is composed of a core that runs at 1.4 GHz, private L1 cache, tag directory and a router. Each cache is split into data and instruction caches with 16 kB capacity each. The complete set of simulation parameters are summarized in the table in FIG. 22. The memory controllers are placed to match the architecture shown in FIG. 21. A few modeling choices were made that deviate from the actual KNL hardware due to the following reasons:

- 32 tiles are used instead of the 36 in the KNL since the number of cores in gem5 is a power of 2. This can be considered as a use-case where the KNL hardware has switched off cores in four of its tiles.
- The cache sizes used are less compared to the actual KNL hardware numbers. This was done to get 95% hit rate in L1 cache, which is usually the hit rate when running embedded applications for the benchmarks that were used. If a larger cache size was used, the L1 hit rate would be 100%, and NoC optimization would not affect cache performance.
- KNL runs AVX512 instructions whereas the gem5 model runs X86. gem5 is yet to support AVX512 instructions.
- Each tile in KNL comprises two cores. The detection mechanism is capable of detecting DDoS attacks irrespective of whether one or both cores in a tile are active. However, the localization method can only pinpoint which tile is malicious. Since detection as well as localization happens at the router level, it is not possible to pinpoint the malicious core in a tile if both cores are active. Therefore, in the experimental setup, it was assumed that one core per tile is active simulating 50% utilization.

Therefore, the gem5 model is a simplified version of the real KNL hardware. However, previous work has validated the model and related performance and energy results show that it accurately captures relative advantages/disadvantages of using different memory and cluster modes. To evaluate the security framework, out of the memory and cluster modes, the cache memory mode and all-to-all cluster mode was modeled:

Cache memory mode: In the cache mode, MCDRAM acts as a last level cache which is placed in between the DDR memory and the private cache. All memory requests first go to the MCDRAM for a cache memory lookup, if there is a cache miss, they are sent to the DDR memory.

All-to-all cluster mode: In this mode, there is no affinity between the core, memory controller and directory. That is, a memory request can go from any directory to any memory controller.

The traffic flow when applications are running is defined by these modes. FIG. 21 shows an example of the traffic flow.

The same real traffic patterns (benchmarks) from the Experimental Results Section were used. To mimic the highly parallel workloads executable by the KNL architecture, 50% of the total available cores were utilized when running each application by running an instance of the benchmarks in each active core. The DDR address space was used uniformly for each benchmark. Attackers were modeled and placed randomly in 25% of the tiles that doesn't have an application instance. The DDoS attack was launched at the memory controller that experienced highest traffic during normal operation. Given that the model has 32 cores, 16 of them ran instances of the benchmark and 4 of the non-active cores injected packets directed at the memory controller to simulate the behavior of malicious IPs launching a DDoS attack. The packet stream period and attack period were selected as explained. FIG. 23 illustrates the 4×8 Mesh NoC architecture used to simulate DoS attacks in an architecture similar to KNL, and shows the placement of the four M3PIPs, cores running the benchmarks (active cores) and the victim IP when running the RADIX benchmark. The victim IP depends on the benchmark since it is the IP connected to the memory controller experiencing highest traffic during normal operation.

Figure 24:
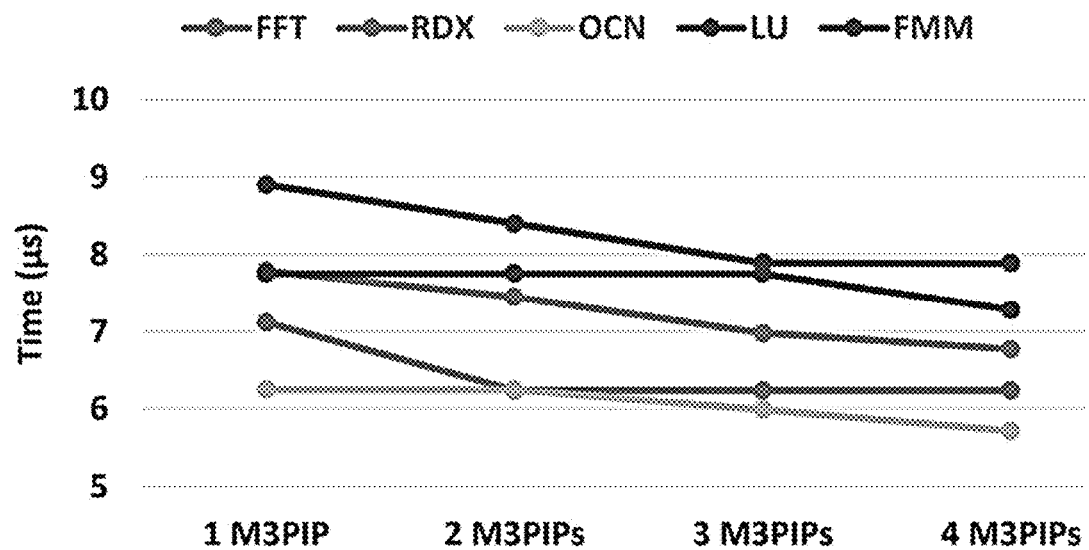
FIGS. 24-26 illustrate comparisons of attack detection and localization times for different network topologies, in accordance with various embodiments of the present disclosure.
Figure 25:
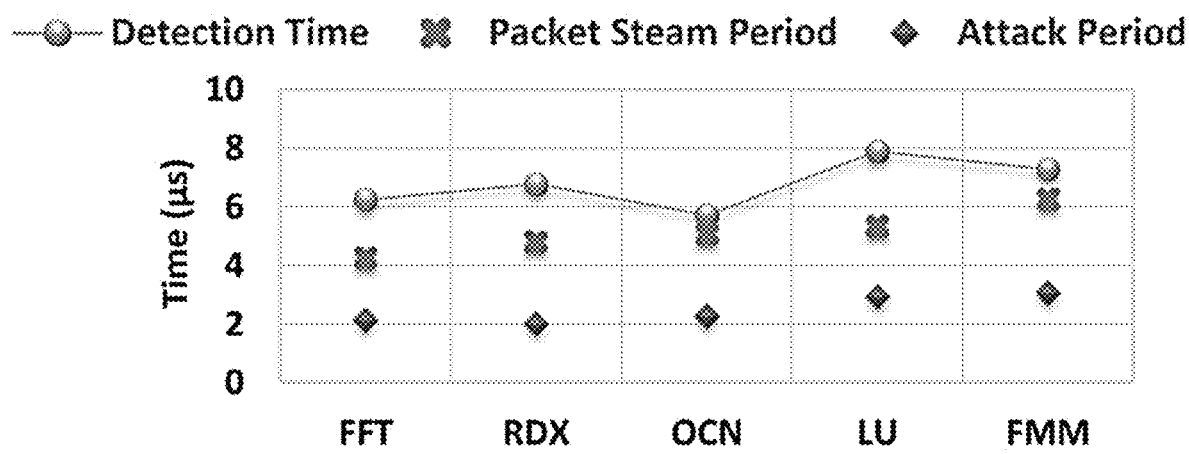
Figure 26:
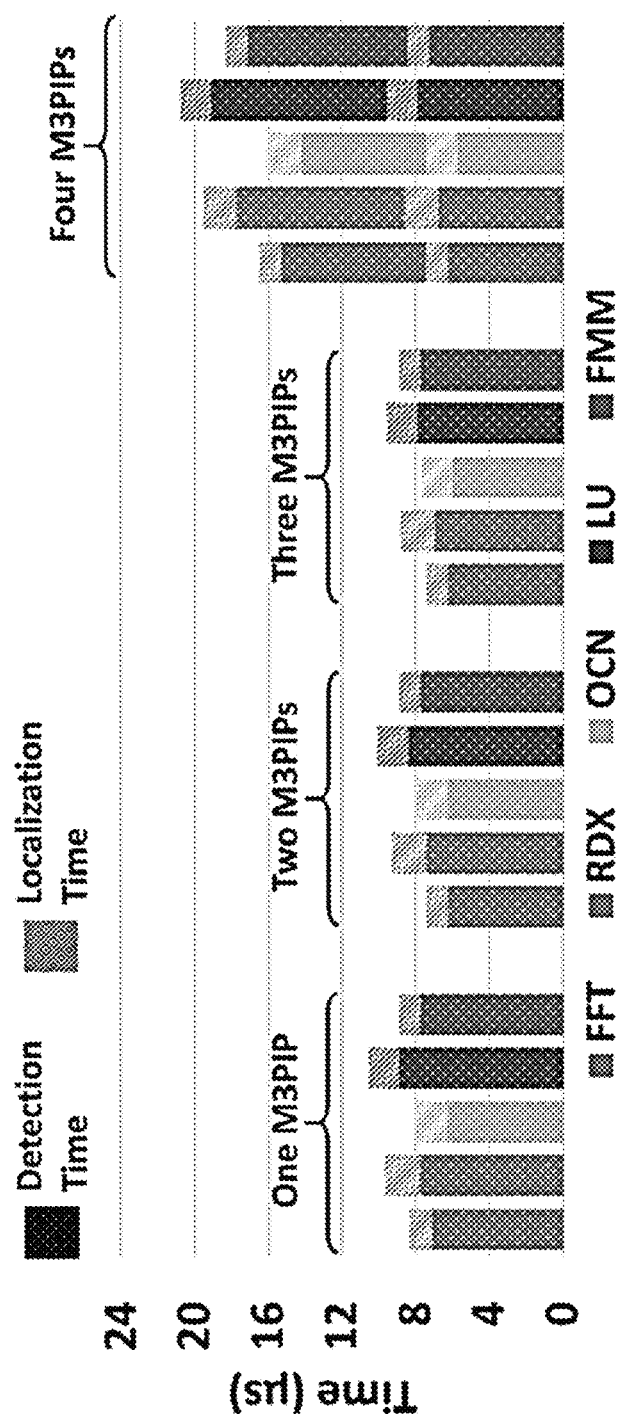

Similar to the experimental results, the DDoS attack detection results are shown in FIGS. 24 and 25. FIG. 24 illustrates attack detection time when running real benchmarks on an architecture similar to KNL with the presence of different numbers of M3PIPs and FIG. 25 illustrates attack detection time when running real benchmarks on the architecture similar to KNL with the presence of four M3PIPs. Attack localization results are shown in FIG. 26. Until the fourth M3PIP is added, there are no overlapping congested paths. Therefore, the M3PIPs are localized using only one iteration. Once the fourth M3PIP is added, the first, third and fourth M3PIPs are localized during the first iteration and a second iteration is needed to localize the second M3PIP. This is reflected in the localization time in FIG. 26. From these as well as the previous results one can note that the disclosed detection and localization framework gives real-time results across different topologies and architectures.

The proposed approach is designed for DoS/DDoS attack detection and localization, and therefore, may not be suitable to capture other forms of security violations such as eavesdropping, snooping and buffer overflow. Specific security attacks may require other security countermeasures which are not covered in this disclosure. Due to the low implementation cost, the disclosed approach can be easily coupled with other security countermeasures, e.g., a snooping attack in which the header of the packet is modified before injecting into the NoC. This will alter the source address of the packet. While the detection mechanism does not depend on any of the header information of the packet, since the localization method uses the source address to localize the M3PIPs, an address validation mechanism needs to be implemented at each router to accommodate header modification. The address validation can be implemented as follows. Before a router injects each packet that comes from the local IP into the NoC, the router can check the source address and if it not the address of the local IP attached to that router, the router can drop it without injecting in to the NoC.

The proposed work is targeted for embedded systems with real-time constraints. Such systems allow only a specific set of scenarios in order to provide real-time guarantees. In order to apply the proposed approach in general purpose systems, we need to store PACs and DLCs corresponding to each scenario and select the respective curves during runtime. As discussed, the hardware overhead to store the parameterized curves for each scenario is minimal, which comprises of two major parts: (i) overhead for storing the curves (1×m×4 bytes), and (ii) overhead for runtime monitoring (6% of NoC area). For example, if an 8×8 Mesh is considered, the memory overhead to store the curves would be 56 bytes (m=14). If N scenarios are considered, the overhead would be 6%+N×56. Therefore, it may be feasible to consider a small number of scenarios (e.g., N<10) without violating area overhead constraints.

A real-time and lightweight DoS/DDoS attack detection and localization mechanism has been presented for IoT and embedded systems. It relies on real-time network traffic monitoring to detect unusual traffic behavior. A real-time and efficient technique for detection of DDoS attacks originating from multiple malicious IPs in NoC-based SoCs. Once an attack is detected, our approach is also capable of real-time localization of the malicious IPs using the latency data in the NoC routers. The effectiveness of the disclosed approach was demonstrated using several NoC topologies and traffic patterns. In the experiments, all the attack scenarios were detected and localized in a timely manner. Overhead calculations have revealed that the area overhead is less than 6% to implement the proposed framework on a realistic NoC model. This framework can be easily integrated with existing security mechanisms that address other types of attacks such as buffer overflow and information theft.

The utility of the proposed algorithm has been demonstrated on Network-on-Chip (NoC) in System-on-Chip (SoC) designs. The proposed algorithm can also be applied to detect denial-of-service (DoS) attacks on other application-specific networks such as, but not limited to, automotive networks. For example, in an automotive network, different components (e.g., infotainment, advanced driver assistance systems, etc.) are connected through communication fabric. Each of these components can comprise multiple interconnected sub-components. For example, adaptive driver assistance systems can support multiple activities including adaptive cruise control, automatic braking, collision avoidance systems, etc. Moreover, each of these components can comprise multiple NoC-based SoCs. Similar to NoC-based SoCs, messages are routed between these components through a well-defined communication fabric in an automotive network. As a result, bounds of packet arrival curves (PAC) can be determined, and any deviation from the expected curve can trigger a potential DoS attack. Similarly, the localization algorithm will also work on these application-specific networks.

It has been demonstrated that the proposed algorithm works in the presence of a single attacker, but the algorithms can be extended to handle multiple attackers. In other words, the disclosed methodology can be extended to detect and localize DoS attacks in the presence of multiple attackers. Additional details are provided in "Real-time Detection and Localization of Distributed DoS Attacks in NoC based SoCs" by S. Charles et al. (IEEE Trans. on Computer-Aided Design of Integrated Circuits and Systems, February 2020), which is hereby incorporated by reference in its entirety.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for detection and localization of denial-of-service (DoS) attacks, comprising:
   receiving, by a router of an intellectual property (IP) core in a network-on-chip (NoC) based system-on-chip (SoC) architecture, a packet stream;
   detecting, by the router, that the packet stream is a compromised packet stream based at least in part upon a packet arrival curve (PAC) associated with the router, the PAC defining a maximum number of packets of the packet stream arriving at the router within a time interval;
   identifying, by the IP core, a candidate IP core in the NoC as a potential attacker based at least in part upon a destination packet latency curve (DLC) associated with the IP core, the DLC indicating latency against hop count for packets of the packet stream arriving at the IP core; and
   transmitting, by the router, a notification message indicating that the candidate IP core is the potential attacker to a router of the candidate IP core.

2. The method of claim 1, further comprising:
   in response to the notification message indicating that the candidate IP core is the potential attacker, updating a flag corresponding to a port in the router of the candidate IP core, the flag indicating that the candidate IP core is the potential attacker; and
   after a predefined period of time, transmitting a verification message confirming that the candidate IP core is an attacker in response to the flag indicating that the candidate IP core is the potential attacker.

3. The method of claim 2, further comprising:
   updating the flag to indicate that another IP core is the potential attacker in response to receiving, during the predefined period of time, a second notification message indicating that the other IP core is the potential attacker.

4. The method of claim 2, wherein the predefined period of time is based upon communication latency between the router of the IP core and routers along a path of the compromised packet stream.

5. The method of claim 1, wherein the PAC comprises an upper bound for packet arrivals during a corresponding fixed time interval.

6. The method of claim 5, wherein the compromised packet stream is detected based upon comparison of a current packet arrival count over the corresponding fixed time interval with the upper bound for the corresponding fixed time interval.

7. The method of claim 1, wherein the DLC comprises mean and variance of latency distributions for different hop counts from the router.

8. The method of claim 7, wherein the candidate IP core is identified as the potential attacker based upon a comparison of a current latency distribution with the mean and variance of the DLC.

9. A method for detection and localization of denial-of-service (DoS) attacks, comprising:
   receiving, by a router of an intellectual property (IP) core in a network-on-chip (NoC) based system-on-chip (SoC) architecture, a notification message indicating that the IP core is a potential attacker of a compromised packet stream detected based at least in part upon a packet arrival curve (PAC) associated with a second router of a second IP core in the NoC, the PAC defining a maximum number of packets of a packet stream arriving at the second router within a time interval, where the IP core was identified as the potential attacker based at least in part upon a destination packet latency curve (DLC) indicating latency against hop count for packets of the compromised packet stream arriving at the second IP core;
   in response to the notification message, updating by the router a flag corresponding to a port in the router, the flag indicating that the IP core is the potential attacker;
   monitoring for additional notification messages for a predefined period of time, where the flag is updated by the router in response to the additional notification messages that are received during the predefined period of time; and
   after the predefined period of time, transmitting by the router a verification message confirming that the IP core is an attacker in response to the flag indicating that the IP core is the potential attacker.

10. The method of claim 9, further comprising:
    updating the flag to indicate that another IP core is the potential attacker in response to receiving, during the predefined period of time, a second notification message indicating that the other IP core is the potential attacker.

11. The method of claim 9, wherein the notification message is received from the second router.

12. The method of claim 11, wherein the IP core is identified in response to the second router detecting the compromised packet stream.

13. The method of claim 12, wherein the IP core is identified as the potential attacker by the second router.

14. The method of claim 9, wherein the predefined period of time is based upon communication latency between the second router and routers along a path of the compromised packet stream.

* * * * *